(12) United States Patent
Enomoto et al.

(10) Patent No.: US 9,550,885 B2
(45) Date of Patent: Jan. 24, 2017

(54) TRANSPARENT RESIN COMPOSITION HAVING GOOD CHEMICAL RESISTANCE, DURABILITY AND STABILITY UNDER NATURAL ENVIRONMENTAL CONDITIONS, HARSHER NATURAL ENVIRONMENTAL CONDITIONS, AND SIMILAR OR HARSHER USAGE CONDITIONS, AND PRODUCT USING SAME

(75) Inventors: Norihide Enomoto, Tokyo (JP); Tatsuya Hasegawa, Tokyo (JP)

(73) Assignee: MIDORI ANZEN CO., LTD., Tokyo (JP)

( * ) Notice: Subject to any disclaimer, the term of this patent is extended or adjusted under 35 U.S.C. 154(b) by 95 days.

(21) Appl. No.: 13/985,989

(22) PCT Filed: Feb. 17, 2012

(86) PCT No.: PCT/JP2012/054671
§ 371 (c)(1),
(2), (4) Date: Aug. 16, 2013

(87) PCT Pub. No.: WO2012/111860
PCT Pub. Date: Aug. 23, 2012

(65) Prior Publication Data
US 2013/0324645 A1 Dec. 5, 2013

(30) Foreign Application Priority Data
Feb. 18, 2011 (JP) ................................. 2011-033955

(51) Int. Cl.
| | |
|---|---|
| *C08K 5/13* | (2006.01) |
| *C08K 5/357* | (2006.01) |
| *G02B 1/04* | (2006.01) |
| *C08K 5/29* | (2006.01) |

(52) U.S. Cl.
CPC ............... *C08K 5/357* (2013.01); *G02B 1/04* (2013.01); *G02B 1/041* (2013.01); *C08K 5/13* (2013.01); *C08K 5/29* (2013.01)

(58) Field of Classification Search
CPC ............. C08K 5/13; C08K 5/29; C08K 5/357; G02B 1/04; G02B 1/041
See application file for complete search history.

(56) References Cited

U.S. PATENT DOCUMENTS

| | | | |
|---|---|---|---|
| 2,901,466 A | 8/1959 | Kibler et al. | |
| 5,106,944 A | 4/1992 | Sublett | |
| 5,540,139 A | 7/1996 | Martensen et al. | |
| 5,668,243 A | 9/1997 | Yau et al. | |
| 5,804,626 A * | 9/1998 | Rogers | C08L 67/02 524/195 |
| 2006/0287482 A1 | 12/2006 | Crawford et al. | |
| 2006/0287494 A1 | 12/2006 | Crawford et al. | |
| 2008/0293882 A1 | 11/2008 | Germroth et al. | |
| 2009/0093573 A1 | 4/2009 | Germroth et al. | |
| 2009/0093574 A1 | 4/2009 | Crawford et al. | |

FOREIGN PATENT DOCUMENTS

| | | |
|---|---|---|
| JP | 07-090163 | 4/1995 |
| JP | 07-100904 | 4/1995 |
| JP | 11-506847 | 6/1999 |
| JP | 11-512484 | 10/1999 |
| JP | 11-323100 | 11/1999 |
| JP | 3122485 | 10/2000 |
| JP | 2000-309631 | 11/2000 |
| JP | 2001-055391 | 2/2001 |
| JP | 2002-523647 | 7/2002 |
| JP | 2003-41030 | 2/2003 |
| JP | 2003-506592 | 2/2003 |
| JP | 3388990 | 3/2003 |
| JP | 2003-105620 | 4/2003 |
| JP | 3432830 | 5/2003 |

(Continued)

OTHER PUBLICATIONS

Yao et al., "Development on the study of carbodiimide anti-hydrolysis agent," Fine and Specialty Chemicals, Jan. 2011, issue 1, pp. 8-11 (English language abstract provided).
Opposition issued Nov. 26, 2015 in corresponding Japanese patent application, 1059 pages total (submitted in 4 parts).
Eastman Chemical Company, Product Pamphlet MBS-614, "Face protection is about to get a face-lift," 2009, 3 pages total.
Eastman Chemical Company, Product Pamphlet MBS-633, "Face protection materials," 2010, 5 pages total.
Eastman Chemical Company, Product Pamphlet MBS-610, "A unique vision for face protection: combine impact strength with chemical resistance," 2010, 9 pages total.
Extended European Search Report, Sep. 19, 2016, European Patent Application No. PCT/JP2012054671 (7 pages).

*Primary Examiner* — Kriellion Sanders
(74) *Attorney, Agent, or Firm* — Hamre, Schumann, Mueller & Larson, P.C.

(57) ABSTRACT

The invention provides a transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester, and further comprising an ultraviolet absorber composed of a benzoxazinone-based compound and/or a hydrolysis inhibitor composed of a carbodiimide; a transparent resin composition which is stable and has weather resistance and chemical resistance under even harsher usage conditions; and a transparent resin composition which is stable and has weather resistance and chemical resistance under the above conditions, the composition further comprising an antioxidant and a heat-resistant material. These transparent resin compositions can be used for helmets, face shields for helmets, lenses for spectacles, outer cases for storing items, sheet materials for outdoor installation, and frames and temples for spectacles.

10 Claims, 6 Drawing Sheets

(56) References Cited

FOREIGN PATENT DOCUMENTS

| | | |
|---|---|---|
| JP | 2004-016476 | 1/2004 |
| JP | 2004-359707 | 12/2004 |
| JP | 3647036 | 2/2005 |
| JP | 2005-507006 | 3/2005 |
| JP | 2006-089859 | 4/2006 |
| JP | 2006-182980 | 7/2006 |
| JP | 2007-210138 | 8/2007 |
| JP | 2007-285944 | 11/2007 |
| JP | 2008-83191 | 4/2008 |
| JP | 4105919 | 6/2008 |
| JP | 2008-500204 | 10/2008 |
| JP | 2010-510376 | 4/2010 |
| JP | 2010-248496 | 11/2010 |
| KR | 10-2005-0010064 | 1/2005 |
| WO | 94/01495 | 1/1994 |
| WO | 96/39678 | 12/1996 |
| WO | 96/41831 | 12/1996 |
| WO | 97/11106 | 3/1997 |
| WO | 00/12792 | 3/2000 |
| WO | 01/10929 | 2/2001 |
| WO | 03/035735 | 5/2003 |
| WO | 2005/118287 | 12/2005 |
| WO | 2008/063719 | 5/2008 |
| WO | WO 2010022353 A1 * | 2/2010 |
| WO | 2010110273 | 9/2010 |
| WO | 2012/115971 | 8/2012 |

* cited by examiner (a)

(b)

140 # TRANSPARENT RESIN COMPOSITION HAVING GOOD CHEMICAL RESISTANCE, DURABILITY AND STABILITY UNDER NATURAL ENVIRONMENTAL CONDITIONS, HARSHER NATURAL ENVIRONMENTAL CONDITIONS, AND SIMILAR OR HARSHER USAGE CONDITIONS, AND PRODUCT USING SAME

TECHNICAL FIELD

The present invention relates to a novel polycyclohexylene dimethylene terephthalate copolyester composition which is stable under natural environmental conditions and similar or harsher usage conditions, and a product using the same.

BACKGROUND ART

Helmets, which are one item of safety equipment, are now being worn proactively in numerous fields, including the industrial field, distribution field, construction and engineering field, and in the field of products used in social life. Among the materials for these helmets, polycarbonate (PC), acrylic-butadiene-styrene resin (ABS) and glass fiber-reinforced thermosetting resins (FRP) are widely known (Patent Document 1: JP 2003-105620 A). Among these, polycarbonate is attracting particular attention in terms of the properties mentioned below, and is starting to also be used widely in other technical fields.

Polycarbonate is a transparent amorphous resin. This resin exhibits minimal mold shrinkage, good dimensional precision and minimal water absorption, and therefore displays good dimensional characteristics. It is a material that has outstanding impact resistance, together with minimal creep and favorable heat resistance, electrical properties, self-extinguishing properties and light resistance.

A problem that has been identified for this material is its lack of chemical resistance (Non-Patent Document 1: "Plastic Data Book", jointly edited by Asahi Kasei Amidas Corporation and the editorial department of "Plastics", published Dec. 1, 1999 by Kogyo Chosakai Publishing Co., Ltd., pages 599 and 605).

In the case of helmets used outdoors, when the helmet is used under severe conditions, including under conditions of sunlight and high temperature, or even under conditions of low temperature and high humidity, contamination of the polycarbonate material that constitutes the helmet is severe, and in such cases, it is essential to perform a chemical treatment to remove surface contamination. It is thought that when this type of treatment is performed, the polycarbonate resin can undergo sudden damage, including dissolution or swelling, and whitening or cracking, which is problematic for its use as a product.

Table 1 illustrates the results of measurements performed by the inventors of the present invention to evaluate the chemical resistance of polycarbonate to a variety of different chemicals.

TABLE 1

| Chemical type | Organic solvents | Salts | Alkalis | Acids | Oxidizing agents |
|---|---|---|---|---|---|
| 10-grade evaluation | 3 | 10 | 1 | 7 | 6 |

The results in the table represent evaluation grades out of 10. A higher number indicates better chemical resistance. It is evident that polycarbonate is readily permeable to alkali and organic solvents, and does not exhibit stability to these chemicals. Further, because polycarbonate has ester bonds, it is thought that when exposed to alkaline solutions or hot water, the polycarbonate undergoes a hydrolysis reaction, resulting in degradation of the products using such materials. On the other hand, it has been assumed that even in the presence of water or acid, and under both normal temperature or low temperature conditions, almost no hydrolysis occurs. Under conditions of high temperature and high humidity, because hot water is present, the occurrence of a hydrolysis reaction is a concern.

When an alkaline solution is present, it is thought that the hydrolysis reaction can accelerate under the effects of the concentration and temperature of the solution. When used as the material of a product, these effects must be considered prior to use.

The following countermeasures have been proposed for the resin of polycarbonate helmets having the types of problems outlined above, but sudden damage to helmets during use have still been observed, meaning the uncertainty cannot be eliminated.

Polycarbonate resin molded bodies formed from laminates in which a polycarbonate resin is used as the base material, a water non-absorbing barrier layer composed of an ultraviolet-curable resin coating film is formed as a first layer on at least one surface of the base material, and an anti-fogging layer composed of a water-absorbing ultraviolet-curable resin coating film is formed as a second layer on the first layer are already known (Patent Document 2: JP 2007-210138 A).

The formation, on a plastic goggle lens or helmet shield composed of polycarbonate or the like, of a film that imparts physical properties such as good adhesion and superior wear resistance, and enables the inner surface to exhibit anti-fogging properties as a result of hydrophilicity, and the outer surface to exhibit waterproofness, water droplet resistance, oil resistance and stain resistance as a result of water repellency and oil repellency is already known (Patent Document 3: JP 2006-089859).

Multilayer articles comprising a substrate layer containing at least one thermoplastic polymer and fiber in a range between about 15% by weight and 75% by weight based on the total weight of the fiber-reinforced polymer substrate, and at least one top layer containing at least one thermoplastic polymer having structural units derived from at least one 1,3-dihydroxybenzene and at least one organic dicarboxylic acid are already known (Patent Document 4: JP 2008-500204 A).

Molded resin articles in which an abrasion-resistant organic hard coat layer having a haze of 5% or less is provided on one surface of a base, and an anti-fogging organic hard coat layer formed from a coating material described below is provided on the other surface are already known (Patent Document 5: JP 1996/041831 A1).

A composition comprising a polymer blend derived from: (a) a prepolymer comprising a component selected from the group consisting of free amine groups, free anhydride groups, and combinations thereof, and further comprising structural units derived from a dianhydride and a diamine, and (b) a polymer comprising a reactive component selected from the group consisting of structural groups, terminal groups, and combinations thereof, wherein the reactive component exhibits reactivity with the free anhydride groups, the free amine groups, or combinations thereof, and wherein the polymer blend is non-delaminated (Patent Document 6: JP 2010-51037 A).

Tests using polycarbonate alloys as a raw material have also been conducted. Alloys of polycarbonate and acrylic-butadiene-styrene resin, and polycarbonate and polyester or the like are mostly opaque, and cannot be used in technical fields that require transparency. The results of usage tests performed by the inventors of the present invention also revealed that the chemical resistance is unsatisfactory, and the conclusion was reached that the use of such alloys as a raw material for helmets and the like would be problematic.

The inventors of the present invention have worked hard in developing safety equipment such as helmets. Specifically, they have investigated not only the shape of helmets, but also the problems mentioned above relating to what materials are appropriate for use in helmets. They thought that the continued use of polycarbonate resin was essentially impossible. However, having viewed the large amount of research into the development of new resins that had already been conducted, they felt that the development of a novel resin that could be used as a material for helmets would be extremely difficult. Accordingly, they reached the conclusion that the most realistic approach was to resolve the above problems by using an existing resin, and developing a material that could be used in a stable state under usage conditions.

As described below, conventional polycyclohexylene dimethylene terephthalate copolyester resins have different properties from conventional polycarbonates in that they exhibit chemical resistance when used under normal conditions. However, the field in which the inventors of the present invention are proposing to use polycyclohexylene dimethylene terephthalate copolyester resins requires a material that is stable and has weather resistance and chemical resistance not in favorable environments such as that inside an indoor facility, but under natural environmental conditions, and similar or harsher usage conditions, which represent conditions in which these copolyester resins have not conventionally been used. The addition of other substances to alter the properties and make the resin capable of withstanding these types of conditions can be considered. Even considering the premise of inhibiting decomposition of the polycyclohexylene dimethylene terephthalate copolyester resin, the substance must have a dominant property that inhibits decomposition, and based on the results thereof, measures must be taken to address those factors not covered by the dominant factor. In any event, it was thought that modifying the resin to ensure that it is able to withstand usage conditions would be effective. Polycyclohexylene dimethylene terephthalate resins were investigated from this type of viewpoint.

Polycyclohexylene dimethylene terephthalate resins have been publicly disclosed (Patent Document 7: U.S. Pat. No. 2,901,466). Since then, polycyclohexylene dimethylene terephthalate copolyester resins produced by Eastman Chemical Company have also become well known (for example, Patent Document 8: JP H11-512484 A, and JP 3,432,830 B). Further, production methods have also been disclosed in U.S. Pat. No. 5,106,944 (Patent Document 9) and U.S. Pat. No. 5,668,243 (Patent Document 10). Modified polycyclohexylene dimethylene terephthalate copolyesters have been confirmed as having good impact resistance, minimal creep, and good heat resistance and electrical properties. In the formation of a copolyester, the reaction between a glycol component and a dicarboxylic acid component can be performed under normal polyester polymerization conditions. The copolyester is produced by a transesterification reaction. When a copolyester is produced from an ester-type dicarboxylic acid component, the reaction process can be composed of two steps. In the first step, a glycol component and a dicarboxylic acid component such as dimethyl isophthalate and dimethyl terephthalate are reacted under high temperature, typically about 180 to about 280° C., and under a pressure of about 0.0 to about 60 psig. The temperature of the transesterification reaction is preferably about 190 to about 240° C., and the pressure is preferably about 15 to about 40 psig. The reaction product is heated at an even higher temperature and under reduced pressure to form a polyester by a glycol elimination. The glycol is easily volatilized under these conditions, and is removed from the system. This polycondensation step which represents the second step can be continued under higher vacuum conditions, and typically at a temperature of about 240 to about 300° C., preferably about 245 to about 290° C., and most preferably within a range from about 250 to 270° C., until a polyester of the desired polymerization degree, as determined by I.V., is obtained. It is known that the polycondensation step can be performed under reduced pressure within a range from about 400 to about 0.1 mmHg (torr) (Patent Document 11: JP 2003-506592 A, Patent Document 12: JP 2002-523647 A). Further, a production method in which a polyester or an oligomer thereof is supplied and passed through a vertical stirred thin-film evaporator in a molten state, thus obtaining a polyester having a higher polymerization degree than that prior to supply is also known (Patent Document 13: JP 2000-309631 A).

As a result of active research, it is also known that polyesters such as poly-1,4-cyclohexylene dimethylene terephthalate-isophthalate and copolyesters thereof undergo hydrolysis in the presence of minute amounts of water, and innovations have been adopted to avoid this hydrolysis (Patent Document 14: JP 2007-285944 A).

A polyester support for an anti-fogging film formed from a biaxially stretched polyester film comprising, as a copolymerization component, a polyester of an aromatic dicarboxylic acid having a metal sulfonate group and a polyalkylene glycol is also known. An ultraviolet absorber is added to this polyester support for an anti-fogging film formed from a polycyclohexylene dimethylene terephthalate (Patent Document 15: JP 2004-359707 A).

Furthermore, the addition of a carbodiimide or the like to prevent hydrolysis of a polyester is also known (Patent Document 16: JP H11-506847 A).

The use of a film having an ultraviolet shielding effect during pattern transfer is also known (Patent Document 17: JP 4,105,919 B). Further, a thermoplastic polyester molding composition comprising a polyester resin and an ultraviolet stabilizing system, which is suitable for preparing a molded item that is resistant to decomposition and discoloration even when exposed to ultraviolet radiation for long periods is also known (Patent Document 18: JP H11-323100 A).

A polymer composition comprising a blend of at least two different polymers selected from the group consisting of polystyrene, polycarbonate, polyetherimide, polyolefin, polysulfone, polyethersulfone, polyacetal, nylon, polyester, polyphenylene sulfide, polyphenylene oxide and polyetheretherketone, and at least one elastomer having a tensile modulus less than about 50,000 prig for toughening these polymers (Patent Document 19: JP 3,647,036 B) is disclosed as having wear resistance, superior crack propagation resistance, lower yield strength, and increased transfer film ductility.

CITATION LIST

Patent Documents

Patent Document 1: JP 2003-105620 A
Patent Document 2: JP 2007-210138 A
Patent Document 3: JP 2006-089859 A
Patent Document 4: JP 2008-500204 A
Patent Document 5: JP 1996/041831 A1
Patent Document 6: JP 2010-51037 A
Patent Document 7: U.S. Pat. No. 2,901,466
Patent Document 8: JP H11-512484 A, JP 3,432,830 B
Patent Document 9: U.S. Pat. No. 5,106,944
Patent Document 10: U.S. Pat. No. 5,668,243
Patent Document 11: JP 2003-506592 A
Patent Document 12: JP 2002-523647 A
Patent Document 13: JP 2000-309631 A
Patent Document 14: JP 2007-285944 A
Patent Document 15: JP 2004-359707 A
Patent Document 16: JP H11-506847 A.
Patent Document 17: JP 4,105,919 B
Patent Document 18: JP H11-323100 A
Patent Document 19: JP 3,647,036 B Non-Patent Document Non-Patent Document 1: "Plastic Data Book", jointly edited by Asahi Kasei Amidas Corporation and the editorial department of "Plastics", published Dec. 1, 1999 by Kogyo Chosakai Publishing Co., Ltd., pages 599 and 605.

As mentioned above, the inventors of the present invention have worked hard in developing and producing helmets and the like. When conventionally used polycarbonate resins are used, poor chemical resistance has been identified as a problem, and the inventors have worked towards resolving this problem. The difficult in performing processing to impart conventionally used polycarbonate resins with chemical resistance, and the problems associated with developing new resins that can be used as helmet materials have been foreseen.

Accordingly, the inventors thought that using an existing resin, and processing that resin to form a material appropriate for use, thereby resolving the above problems, required urgent attention.

A first problem that the present invention attempts to address is the provision of a novel transparent resin composition which is stable and has weather resistance and chemical resistance under natural environmental conditions, including the presence of sunlight, rainwater or wash water, atmospheric pollutants and the oxygen in air, and high-temperature high-humidity or low-humidity conditions accompanied by sunlight irradiation, under even harsher natural environmental conditions, and under similar or harsher usage conditions, which represent the usage conditions for products such as helmets.

A second problem that the present invention attempts to address is the provision of a helmet, a face shield for a helmet, a lens for goggles or spectacles, an outer case for storing items, and a sheet material for outdoor installation, using a material which is stable and has weather resistance and chemical resistance under natural environmental conditions, including the presence of sunlight, rainwater, atmospheric pollutants and the oxygen in air, and high-temperature high-humidity or low-humidity conditions accompanied by sunlight irradiation, and under similar or harsher usage conditions, which represent the usage conditions for products such as helmets.

Means for Solution of the Problems (1) It was found that the polycyclohexylene dimethylene terephthalate copolyester resin Tritan™ (a product name, manufactured by Eastman Chemical Company) does not exhibit the type of poor chemical resistance observed for conventional polycarbonate resins, and was able to adequately withstand use under normal conditions. Further, at the same time, it was also discovered that Tritan™ had properties that enabled use in a similar manner to conventional materials with respect to properties other than chemical resistance, such as impact resistance, minimal creep, heat resistance, electrical properties, self-extinguishing properties and light resistance, which are the characteristic properties of conventional polycarbonate resins.

(2) In the case of a helmet which uses the polycyclohexylene dimethylene terephthalate copolyester resin Tritan™ as a material, the anticipated results could not be achieved under natural environmental conditions, including the presence of sunlight, rainwater or wash water, atmospheric pollutants and the oxygen in air, and high-temperature high-humidity or low-humidity conditions accompanied by sunlight irradiation, or under similar or harsher usage conditions. It was discovered that in order to produce a material capable of withstanding these conditions, some form of specific treatment was required.

(3) It became necessary to identify what type of material would be effective for combining with the polycyclohexylene dimethylene terephthalate copolyester resin Tritan™ in order to enable stable use under natural environmental conditions, including the presence of sunlight, rainwater or wash water, atmospheric pollutants and the oxygen in air, and high-temperature high-humidity or low-humidity conditions accompanied by sunlight irradiation, or under usage conditions such as operating conditions, which represent the usage conditions for products such as helmets. The polycyclohexylene dimethylene terephthalate copolyester resin Tritan™ is relatively stable even compared with conventional resins, and it could not be assumed that the various widely known stabilizers would be as effective as in these conventional materials. It was found that, in this case, simply specifying materials having a certain action in order to withstand specific conditions was inadequate, and that it was necessary to identify which of the materials was effective. Further, it was also necessary to consider factors such as the presence of light, the presence of water and the presence of minute amounts of chemical substances, and measures for dealing with these factors, as well as which of these factors were the main causes of problems, so that a determination could be made as to which material would be most effective for dealing with these factors.

(4) First, a determination was made as to whether or not countermeasures for preventing light degradation, heat degradation and hydrolysis were effective as weather resistance agents, and in particular, a determination was made as to which substances acted effectively.

A. Use of Light Degradation Inhibitors as Weather Resistance Agents

Light degradation inhibitors include both those cases in which "light" is deemed to refer to ultraviolet inhibitors, and those cases which consider infrared radiation. Materials which prevent oxidative degradation caused by light (mainly ultraviolet radiation) are referred to generically as light stabilizers. They can be broadly classified into ultraviolet absorbers which have a chain initiation inhibiting action, hindered amine-based stabilizers which have a radical scavenging action, and benzoate-based stabilizers which combine both actions. Ultraviolet absorbers absorb ultraviolet radiation and convert it to kinetic energy and thermal energy which are harmless to plastics. Benzotriazole systems and benzophenone systems are mainly used. Hindered amine-based stabilizers capture the radicals produced by ultraviolet radiation, and have the effects of preventing discoloration and maintaining gloss. They are also effective in preventing thermal oxidation. Many inhibitors are known as ultraviolet inhibitors. Not all of these inhibitors are effective, and it is thought that those materials having distinct actions are limited. For example, with UVa (Novapex® U-110, ultraviolet-blocking polyester resin manufactured by Mitsubishi Chemical Corporation), UVb (Irganox®, phenolic antioxidant manufactured by BASF Corporation) and UVc (Seesorb™ 706, phenylmethylbenzotriazole UV absorber manufactured by Shiraishi Calcium Kaisha, Ltd.), satisfactory results could not be obtained in terms of color difference, transmittance, Charpy impact strength and tensile breaking strength, and a final judgment was made that the materials had no effect.

The ultraviolet absorber UV-3638™ (benzoxazinone UV absorber manufactured by Sun Chemical Company Ltd.), which is an oxazinone-based compound, produces no deterioration in transmittance and no fluctuation in the Charpy impact strength, and was adjudged to be effective for use as a light degradation inhibitor. Although there was no problem in terms of the Charpy impact strength, the conclusion was reached that this material could not be used on its own. Use of a light degradation inhibitor was not a major factor.

B. Use of Hydrolysis Inhibitors as Weather Resistance Agents

Whether or not stable substances such as Tritan™ are prone to hydrolysis reactions under usage conditions is unclear in current thinking. On the other hand, when used in environments where water exists, polycyclohexylene dimethylene terephthalate copolyesters having ester bonds have a property of undergoing hydrolysis depending on the environmental conditions, and therefore the conclusion was reached that instituting a countermeasure for preventing hydrolysis was necessary. For example, even if almost no hydrolysis occurs at normal temperature or low temperature in the presence of only water or even acid, hydrolysis may occur in the presence of only water under conditions of high temperature and high humidity, and under conditions in the presence of a solution containing an alkali component, it is said that the hydrolysis is accelerated while being influenced by the concentration of the solution and the temperature.

(a) 5% of E-pellets of Carbodilite™, polycarbodiimide resin available from Nisshinbo Chemical Inc., diluted with PET (manufactured by Nisshinbo Chemical Inc.) was added to Tritan™ TX1001.

When the E-pellets were added to TX1001, the TX1001 and PET did not mix uniformly in the initial state, cloudiness occurred, the transmittance was unsatisfactory (a transmittance of about 80), and slight yellowing was observed, and therefore it could not be claimed that the results were sufficiently satisfactory in terms of color difference and transmittance. However, almost no deterioration in the color difference or transmittance was observed upon 300 hours of an accelerated weather resistance test, with the material remaining stable. In conclusion, a result was obtained that indicated effectiveness in providing weather resistance.

(b) Next, 0.5% of Carbodilite™ in powder form LA-1 (manufactured by Nisshinbo Chemical Inc.) was added to Tritan™ TX1001.

When LA-1 was added to TX1001, the deterioration in transmittance due to cloudiness observed upon addition of the E-pellets was not observed, and the transmittance when LA-1 was added to TX1001 was 90%, compared with the approximately 88% transmittance of TX1001, meaning a satisfactory result was able to be achieved.

Almost no deterioration in the transmittance was observed upon 300 hours of an accelerated weather resistance test, meaning that a satisfactory result was also able to be achieved for the weather resistance.

Because ester bonds are broken and light is absorbed when hydrolysis occurs, resulting in a deterioration in the transmittance, this result means that no hydrolysis is occurring. In a Charpy impact test, the initial result was NB (non-break), but after 100 hours the strength had decreased dramatically, and a satisfactory result could not be obtained. It is thought that this is due to molecular chain breakage caused by ultraviolet radiation.

In terms of the effects on Tritan™, although there was no problem in terms of the transmittance, the low Charpy impact strength was a problem, and a conclusion was reached that a resolution method relying on a hydrolysis inhibitor could not be said to be satisfactory.

C. Use of Heating Inhibitors as Weather Resistance Agents

Heating activates substances, and therefore heating operations can be thought of as providing an effective action. However, preventing heating can often contribute to the stabilization of substances. A determination was to made as to what type of result would be obtained by using a light degradation inhibitor and a hydrolysis inhibitor as substances having a heating prevention factor with a stable substance such as Tritan™. Comparison of the results for a light degradation countermeasure (addition of UV3638™ manufactured by Sun Chemical Company Ltd.), a hydrolysis countermeasure (addition of Carbodilite™ LA-1), and a combination of the light degradation countermeasure and the hydrolysis countermeasure revealed the following.

In terms of the light degradation countermeasure, the initial properties for the Charpy impact strength and the transmittance were high, and even after 300 hours of an accelerated weather resistance test, almost no deterioration was observed.

In terms of the hydrolysis countermeasure, the initial properties for the Charpy impact strength and the transmittance were high, and after 300 hours of an accelerated weather resistance test, almost no deterioration in the transmittance was observed. The Charpy impact strength decreased dramatically.

On the other hand, in the case of the combination of the light degradation countermeasure and the hydrolysis countermeasure, the initial properties for the Charpy impact strength and the transmittance were high, and even after 300 hours of an accelerated weather resistance test, almost no deterioration was observed. Moreover, an improvement in the tensile characteristics was observed, and no deterioration was observed even after 300 hours of an accelerated weather resistance test, meaning satisfactory results were able to be achieved.

It can be said that this result is not only due to the simple combination of the light degradation countermeasure and the hydrolysis countermeasure, but also because a special effect can be obtained which yields superior weather resistance (heating prevention) as a result of a synergistic effect between the light degradation countermeasure and the hydrolysis countermeasure.

(5) Based on the Above Results, the Invention Described Below can be Obtained.

(A) A transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester and an ultraviolet absorber composed of a benzoxazinone-based compound.

(B) A transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester and a hydrolysis inhibitor composed of a carbodiimide.

(C) A transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester, an ultraviolet absorber composed of a benzoxazinone-based compound, and a hydrolysis inhibitor composed of a carbodiimide.

(D) The transparent resin composition which is stable and has weather resistance and chemical resistance under natural environmental conditions, under harsher natural environmental conditions, and under similar or harsher usage conditions disclosed above in any one of (A) to (C), the composition further comprising an antioxidant and a heat-resistant material.

(E) A helmet produced using the transparent resin composition which is stable and has weather resistance and chemical resistance under natural environmental conditions, under harsher natural environmental conditions, and under similar or harsher usage conditions disclosed above in any one of (A) to (D).

(F) A face shield for a helmet, produced using the transparent resin composition which is stable and has weather resistance and chemical resistance under natural environmental conditions, under harsher natural environmental conditions, and under similar or harsher usage conditions disclosed above in any one of (A) to (D).

(G) A spectacle lens produced using the transparent resin composition which is stable and has weather resistance and chemical resistance under natural environmental conditions, under harsher natural environmental conditions, and under similar or harsher usage conditions disclosed above in any one of (A) to (D).

(H) An outer case for storing items, produced using the transparent resin composition which is stable and has weather resistance and chemical resistance under natural environmental conditions, under harsher natural environmental conditions, and under similar or harsher usage conditions disclosed above in any one of (A) to (D).

(I) A sheet material for outdoor installation, produced using the transparent resin composition which is stable and has weather resistance and chemical resistance under natural environmental conditions, under harsher natural environmental conditions, and under similar or harsher usage conditions disclosed above in any one of (A) to (D).

(I) A sheet material for outdoor installation, produced using the transparent resin composition which is stable and has weather resistance and chemical resistance under natural environmental conditions, under harsher natural environmental conditions, and under similar or harsher usage conditions disclosed above in any one of (A) to (D).

(J) A frame for spectacles and a temple for spectacles, produced using the transparent resin composition which is stable and has weather resistance and chemical resistance under natural environmental conditions and usage conditions disclosed above in any one of (A) to (D).

Furthermore, the inventors of the present invention also discovered that the transparent resin composition described above, which is stable and has weather resistance and chemical resistance under natural environmental conditions and under similar or harsher usage conditions, could be used as a gear material having lubrication performance for use in small gears.

Effects of the Invention

According to the present invention, there are provided a transparent resin composition which is stable and has weather resistance and chemical resistance under natural environmental conditions, under harsher natural environmental conditions, and under similar or harsher usage conditions, wherein the composition comprises a polycyclohexylene dimethylene terephthalate copolyester, and an ultraviolet absorber composed of a benzoxazinone-based compound, a hydrolysis inhibitor composed of a carbodiimide, or a combination of an ultraviolet absorber composed of a benzoxazinone-based compound and a hydrolysis inhibitor composed of a carbodiimide; a transparent resin composition which is stable and has weather resistance and chemical resistance under even harsher usage conditions; and one of these transparent resin compositions which is stable and has weather resistance and chemical resistance under natural environmental conditions, under harsher natural environmental conditions, and under similar or harsher usage conditions, wherein the composition further comprises an antioxidant and a heat-resistant material. These transparent resin compositions can be used for helmets, face shields for helmets, lenses for spectacles, outer cases for storing items, sheet materials for outdoor installation, frames for spectacles and templates for spectacles.

BRIEF DESCRIPTION OF THE DRAWINGS

FIG. 8 is a diagram illustrating an apparatus for a Charpy impact strength test.

DESCRIPTION OF EMBODIMENTS

Figure 1:
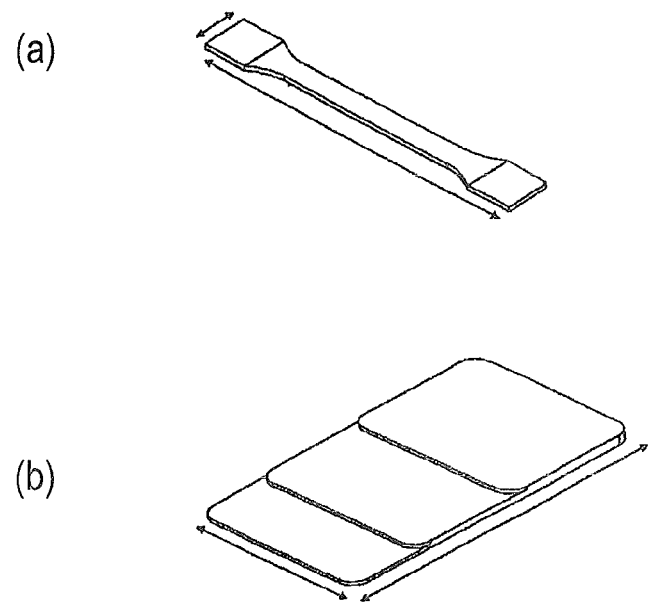
FIG. 1 is a diagram illustrating a test piece used in a performance test.

The polycyclohexylene dimethylene terephthalate copolyester used in the present invention is disclosed in the following publications (JP 3,432,830 B, JP H11-506847 A).

In the formation of a copolyester, the reaction between the glycol component and the dicarboxylic acid component can be performed using typical polyester polymerization conditions. The copolyester is produced by a transesterification reaction. When a copolyester is produced from an ester-type dicarboxylic acid component, the reaction process can be composed of two steps. In the first step, a glycol component and a dicarboxylic acid component such as dimethyl isophthalate and dimethyl terephthalate are reacted under high temperature, typically about 180 to about 280° C., and under a pressure of about 0.0 to about 60 psig. The temperature of the transesterification reaction is preferably about 190 to about 240° C., and the pressure is preferably about 15 to about 40 psig. The reaction product is heated at an even higher temperature and under reduced pressure to form a polyester by a glycol elimination. The glycol is easily volatilized under these conditions, and is removed from the system. This polycondensation step which represents the second step can be continued under higher vacuum conditions, and typically at a temperature of about 240 to about 300° C., preferably about 245 to about 290° C., and most preferably within a range from about 250 to 270° C., until a polyester of the desired polymerization degree, as determined by I.V., is obtained. The polycondensation step can be performed under reduced pressure within a range from about 400 to about 0.1 mmHg (torr) (JP 2003-506592 A).

A molded item of the present invention comprises repeating units formed from an acid component containing 90 to 40 mol %, preferably 85 to 52 mol %, and more preferably 83 to 52 mol % of terephthalic acid, and containing 10 to 60 mol %, preferably 15 to 48 mol %, and more preferably 17 to 48 mol % of cyclohexanedicarboxylic acid as an additional dibasic acid; and the glycol component is 1,4-cyclohexanedimethanol, and preferably The following grades are known for Tritan™, which is obtained using a polycyclohexylene dimethylene terephthalate copolyester, particularly a copolymer resin that comprises a dimethyl terephthalate as an acid component, and comprises a 1,4-cyclohexanedimethanol and a 2,2,4,4,-tetramethylcyclobutan-1,3-diol as a glycol component, from Eastman Chemical Company.

TX1000: a grade with heat resistance of 99° C. (HDT: 0.455 MPa)
TX1001: a grade of TX1000 for injection molding
TX1500HF: a high fluidity grade of TX1000
TX2000: a grade with heat resistance of 109° C. (HDT: 0.455 MPa)
TX2001: a grade of TX2000 for injection molding The physical properties of polycyclohexylene dimethylene terephthalate copolyesters, and the chemical resistance of Tritan™ (product name) were confirmed by the inventors of the present invention. The results are as shown below in Table 2.

TABLE 2

Chemical resistance Eastman Tritan ™

| | Immersion time | | | | | | | | |
|---|---|---|---|---|---|---|---|---|---|
| | 20 hours | | | 200 hours | | | 2000 hours | | |
| Chemical substance | % Volume change | % weight change | external appearance change | % volume change | % weight change | external appearance change | % Volume change | % weight change | external appearance change |
| Acetone | 5.67 | 4.92 | I | 16.18 | 12.86 | I, B | 18.66 | 14.4 | I |
| Diethyl ether | 3.37 | 2.78 | B | 9.39 | 7.31 | I, B | 15.67 | 11.46 | I |
| Dimethylformamide | 3.76 | 3.8 | I | 9.61 | 9.1 | I, B | 21.41 | 18.77 | I |
| Ethyl acetate | 7.24 | 6.84 | I | 22.27 | 18.9 | I, B | 23.33 | 19.46 | I |
| Ethyl alcohol (95%) | −0.13 | 0.03 | A | 0.02 | 0.06 | A | 0.62 | 0.49 | A |
| Ethyl alcohol (50%) | 0.01 | 0.08 | A | 0.19 | 0.21 | A | 0.32 | 0.46 | A |
| Ethylene dichloride | 48.82 | 43.9 | C, D, E, F, I | 127.37 | 72 | C, D, E, G, I | 0 | 0 | F |
| Gasoline | 0.62 | 0.62 | B | 1.61 | 1.46 | A | 4.21 | 3.5 | A |
| Heptane | 0.01 | 0.03 | A | −0.1 | 0.07 | A | 0.01 | 0.09 | A |
| Isooctane | −0.12 | 0.01 | A | 0.14 | 0 | A | 0.06 | −0.04 | A |
| Isopropanol | −0.08 | −0.04 | A | −0.26 | −0.14 | A | −0.09 | −0.14 | A |
| Methyl alcohol | 0.24 | 0.18 | A | 0.34 | 0.57 | A | 1.94 | 2.13 | A |
| Toluene | 15.23 | 12.14 | I | 39.53 | 28.89 | I | 37.09 | 27.3 | I |
| Aniline | 10.07 | 9.33 | I | 27.49 | 24.51 | B | 59.68 | 49.35 | B, C, E, I |
| Brake fluid | −0.13 | −0.03 | A | −0.06 | −0.11 | A | 0.14 | −0.04 | A |
| Cottonseed oil | −0.02 | −0.02 | A | 0.18 | −0.06 | A | −0.07 | −0.04 | A |
| Diesel fuel | 0.01 | 0.04 | A | 0.23 | 0.09 | A | 0.06 | 0.07 | A |
| Phthalate ester | 0.04 | 0.01 | A | 0.23 | 0.05 | A | 0.2 | 0.16 | A |
| Kerosene | 0 | 0.03 | A | 0.25 | 0.04 | A | 0.03 | −0.02 | A |
| Mineral oil | 0.1 | 0.04 | A | 0.14 | 0.09 | A | 0.04 | 0.04 | A |
| Lubricating oil | −0.09 | 0.04 | A | 0 | 0.01 | A | −0.11 | −0.02 | A |
| Oleic acid | 0.26 | −0.29 | A | −0.12 | −0.07 | A | −0.13 | −0.04 | A |
| Olive oil | −0.09 | 0.06 | A | −0.1 | 0.04 | B | −0.11 | −0.02 | B |
| Transformer oil | −0.01 | 0.04 | A | 0.22 | 0.05 | A | −0.12 | 0 | A |
| Terpin oil | −0.03 | 0.06 | A | 0.2 | 0.15 | A | 0.33 | 0.36 | A |
| Transmission fluid | 0 | 0.04 | A | 0.08 | 0.02 | A | −0.12 | −0.02 | B |
| Acetic acid (specific gravity 1.05) | 1.63 | 1.8 | B | 4.05 | 4.38 | I | 11.81 | 12.39 | I |
| Acetic acid (5%) | 0.21 | 0.09 | A | 0.44 | 0.2 | A | −0.15 | 0.28 | A |
| Ammonium hydroxide | 0.19 | 0.14 | A | −0.06 | 0.34 | A | 0.77 | 0.63 | B |
| Ammonium hydroxide (10%) | 0.09 | 0.09 | A | 0.19 | 0.28 | A | 0.15 | 0.34 | B |
| Antifreeze | −0.12 | 0.06 | A | 0.07 | 0.09 | A | −0.12 | 0.12 | A |
| Citric acid (1%) | 0.02 | 0.09 | A | 0.04 | 0.19 | A | 0.13 | 0.27 | A |

TABLE 2-continued

Chemical resistance Eastman Tritan™

| | Immersion time | | | | | | | | |
|---|---|---|---|---|---|---|---|---|---|
| | 20 hours | | | 200 hours | | | 2000 hours | | |
| Chemical substance | % Volume change | % weight change | external appearance change | % volume change | % weight change | external appearance change | % Volume change | % weight change | external appearance change |
| Synthetic detergent (0.25%) | 0.03 | 0.08 | A | 0.06 | 0.19 | A | 0.19 | 0.27 | A |
| Distilled water | −0.04 | 0.1 | A | −0.03 | 0.19 | A | 0.1 | 0.27 | A |
| Hydrochloric acid (specific gravity 1.00) | 0 | 0 | floated | 0 | 0 | floated | 0 | 0 | floated |
| Hydrogen peroxide water (28%) | 0.01 | 0.04 | A | 0.11 | 0.3 | A | 0 | 0 | floated |
| Hydrogen peroxide water (3%) | 0.08 | 0.01 | A | 0.2 | 0.19 | A | 0.21 | 0.29 | A |
| Lipid solution (2%) | 0.09 | 0.01 | A | 0.06 | 0.16 | A | 0.2 | 0.29 | A |
| Nitric acid (specific gravity 1.42) | 0 | 0 | floated | 0 | 0 | floated | 0 | 0 | floated |
| Nitric acid (40%) | 0 | 0 | A | 0.08 | 0.15 | A | 0.21 | 0.34 | A |
| Phenol solution (5%) | 2.8 | 3.11 | I | 6.9 | 7.26 | I | 15.58 | 15.53 | B, E |
| Soapy water (1%) | −0.04 | 0 | A | 0.11 | 0.17 | A | 0.25 | 0.27 | A |
| Sodium carbonate aqueous solution (20%) | −0.09 | 0 | A | 0.18 | 0.15 | A | 0.34 | 0.24 | A |
| Sodium carbonate aqueous solution (2%) | −0.17 | 0 | A | 0.01 | 0.22 | A | 0.1 | 0.38 | A |
| Sodium chloride aqueous solution (10%) | −0.06 | 0.07 | A | −0.13 | 0.2 | A | 0.14 | 0.27 | A |
| Sodium chloride aqueous solution (50%) | 0 | 0 | floated | 0 | 0 | floated | 0 | 0 | floated |
| Sodium hydroxide aqueous solution (10%) | −0.09 | 0.05 | A | 0.05 | 0.2 | A | 0.15 | 0.3 | A |
| Sodium hydroxide (1%) | −0.05 | 0.05 | A | −0.04 | 0.21 | A | 0.1 | 0.33 | A |
| Sodium hypochlorite aqueous solution | −0.02 | 0.02 | A | −0.14 | 0.16 | A | 0 | 0 | floated |
| Sulfuric acid (specific gravity 1.84) | −100 | −100 | F | −100 | −100 | F | −100 | −100 | F |
| Sulfuric acid (30%) | 0 | 0 | floated | 0 | 0 | floated | 0 | 0 | floated |
| Sulfuric acid (3%) | −0.13 | −0.05 | A | −0.06 | 0.22 | A | 0.04 | 0.33 | A |

TABLE 3

External appearance

| | |
|---|---|
| A | no change |
| B | discoloration |
| C | cracking at edges |
| D | surface cracking |
| E | swelling/bubbling |
| F | dissolution |
| G | decomposition in solution |
| I | cloudiness |
| X | other |

Based on the above results, it can be confirmed that polycyclohexylene dimethylene terephthalate copolyester resin exhibits favorable physical properties, and has chemical resistance.

The properties of Tritan™ are as described below.

High degree of transparency. Light transmittance 92% (TX2000).

Impact resistance is similar to polycarbonate. High impact resistance 15 ft-lb/in.

Flexural modulus indicates flexibility. 240 kpsi

High heat resistance (120° C.) (glass transition temperature).

Specific gravity of 1.17, low compared with polycarbonate and PET.

Good environmental properties (this does not contain plasticizers such as bisphenol A).

Further properties are as detailed in the table below.

TABLE 4

| Property | ASTM test method | TX1001 | TX2001 |
|---|---|---|---|
| General properties | | | |
| Specific gravity | D792 | 1.18 | 1.17 |
| Mechanical properties | | | |
| Yield point tensile strength | D638 | 43 MPa | 44 MPa |
| Break point tensile strength | D638 | 53 MPa | 53 MPa |
| Yield point elongation | D638 | 6% | 7% |
| Break point elongation | D638 | 210% | 140% |
| Flexural modulus | D790 | 1550 MPa | 1585 MPa |
| Rockwell hardness, R scale | D785 | 112 | 115 |
| Izod impact strength, notched @23° C. | D256 | did not break | 650 J/m |
| Izod impact strength, no notch @−40° C. | D256 | 129 J/m | 127 J/m |
| Thermal properties | | | |
| Load deformation temperature | | | |
| @ 0.455 MPa (low) | D648 | 99° C. | 109° C. |
| @ 1.82 MPa (high) | | 85° C. | 92° C. |
| Optical properties | | | |
| Total light transmittance | D1003 | 90% | 92% |

TABLE 4-continued

| Property | ASTM test method | TX1001 | TX2001 |
|---|---|---|---|
| Representative molding conditions | | | |
| Drying temperature | | 88° C. | 88° C. |
| Drying time | | 4 to 6 hours | 4 to 6 hours |
| Dew point | | −29° C. or lower | −29° C. or lower |
| Molding resin temperature | | about 282° C. | about 282° C. |
| Die temperature | | 60° C. | 60° C. |

[a]Unless specifically stated otherwise, all tests were performed in an environment at a temperature of 23° C. and a relative humidity of 50%.
[b]Unless specifically stated otherwise, tests were performed using the ASTM method.
[c]Units conform to SI units, or US customary units.

The properties listed above are measured data from materials under development, and are not guaranteed values. Eastman does not guarantee that any of the products conform precisely with the above values.

As shown above, the polycyclohexylene dimethylene terephthalate copolyester resin Tritan™ (product name) has physical properties that exhibit a high degree of stability under normal conditions. It was found that the polycyclohexylene dimethylene terephthalate copolyester resin Tritan™ does not exist stably under natural environmental conditions or similar or harsher usage conditions, specifically under natural environmental conditions including the presence of sunlight, rainwater or wash water, atmospheric pollutants and the oxygen in air, and high-temperature high-humidity or low-humidity conditions accompanied by sunlight irradiation, or under similar or harsher usage conditions, which represent the usage conditions for products such as helmets. In order to enable use of this product in a normal manner, it is necessary to mix a specific substance to enable the product to exist and be used in a stable manner.

The present invention is as described below.

(A) A transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester and an ultraviolet absorber composed of a benzoxazinone-based compound.

(B) A transparent resin composition which is stable and has weather resistance and chemical resistance under natural environmental conditions, under harsher natural environmental conditions, and under similar or harsher usage conditions, the composition comprising a polycyclohexylene dimethylene terephthalate copolyester and a hydrolysis inhibitor composed of a carbodiimide.

(C) A transparent resin composition which is stable and has weather resistance and chemical resistance under natural environmental conditions and under similar or harsher usage conditions, the composition comprising a polycyclohexylene dimethylene terephthalate copolyester, an ultraviolet absorber composed of a benzoxazinone-based compound, and a hydrolysis inhibitor composed of a carbodiimide.

(D) The transparent resin composition which is stable and has weather resistance and chemical resistance under natural environmental conditions, under harsher natural environmental conditions, and under similar or harsher usage conditions disclosed above in any one of (A) to (C), the composition further comprising an antioxidant and a heat-resistant material.

Utilizing these properties, the composition can be used as a material for the products described below.

(E) A helmet produced using the transparent resin composition which is stable and has weather resistance and chemical resistance under natural environmental conditions and under similar or harsher usage conditions disclosed above in any one of (A) to (D).

(F) A face shield for a helmet, produced using the transparent resin composition which is stable and has weather resistance and chemical resistance under natural environmental conditions, under harsher natural environmental conditions, and under similar or harsher usage conditions disclosed above in any one of (A) to (D).

(G) A spectacle lens produced using the transparent resin composition which is stable and has weather resistance and chemical resistance under natural environmental conditions, under harsher natural environmental conditions, and under similar or harsher usage conditions disclosed above in any one of (A) to (D).

(H) An outer case for storing items, produced using the transparent resin composition which is stable and has weather resistance and chemical resistance under natural environmental conditions, under harsher natural environmental conditions, and under similar or harsher usage conditions disclosed above in any one of (A) to (D).

(I) A sheet material for outdoor installation, produced using the transparent resin composition which is stable and has weather resistance and chemical resistance under natural environmental conditions, under harsher natural environmental conditions, and under similar or harsher usage conditions disclosed above in any one of (A) to (D).

(J) A frame for spectacles and a temple for spectacles, produced using the transparent resin composition which is stable and has weather resistance and chemical resistance under natural environmental conditions and usage conditions disclosed above in any one of (A) to (D).

Furthermore, the inventors of the present invention also discovered that the transparent resin composition described above, which is stable and has weather resistance and chemical resistance under natural environmental conditions and under similar or harsher usage conditions, could be used as a gear material having lubrication performance for use in small gears.

The process of specifying the inclusion of the ultraviolet absorber composed of a benzoxazinone-based compound and the hydrolysis inhibitor composed of a carbodiimide was not decided in simple fashion, but rather involved selecting a variety of candidates based on the experiences of the inventors of the present invention, and then making a decision on the basis of experimentation. The content of that process is described below.

(1) In order to resolve the problems using an existing resin, conventional resins were searched and those resins having chemical resistance were investigated, and it was discovered that the polycyclohexylene dimethylene terephthalate copolyester resin Tritan™ had chemical resistance. Further, at the same time, it was also discovered that Tritan™ had properties that enabled use in a similar manner to conventional materials with respect to properties other than chemical resistance, such as impact resistance, minimal creep, heat resistance, electrical properties, self-extinguishing properties and light resistance, which are the characteristic properties of conventional polycarbonate resins.

(2) When the inventors of the present invention subjected the polycyclohexylene dimethylene terephthalate copolyester resin Tritan™ to testing with a weather resistance tester to ascertain whether or not it was a material that was stable and exhibited chemical resistance and weather resistance under natural environmental conditions, including the presence of sunlight, rainwater or wash water, atmospheric pollutants and the oxygen in air, and high-temperature high-humidity or low-humidity conditions accompanied by sunlight irradiation, or under similar or harsher usage conditions, which represent the usage conditions for products such as helmets, the anticipated results could not be obtained. In other words, it was evident that a special innovation was necessary.

(3) Next, surface treatments and laminates were investigated as countermeasures for enabling the polycyclohexylene dimethylene terephthalate copolyester resin Tritan™ to be stably maintained under natural environmental conditions, including the presence of sunlight, rainwater or wash water, atmospheric pollutants and the oxygen in air, and high-temperature high-humidity or low-humidity conditions accompanied by sunlight irradiation, or under usage conditions such as operating conditions, which represent the usage conditions for products such as helmets. It was clear that no particularly favorable results could be expected, and therefore repeated testing was performed in the manner described below.

Investigations were performed relating to countermeasures for dealing with those properties that were particularly problematic, namely countermeasures for dealing with light degradation, heat degradation and degradation by hydrolysis.

The weather resistance testing yielded test results from a variety of angles, and different results from those of the initially tested content were obtained, enabling a conclusion to be made.

In Relation to Chemical Resistance (A) In relation to Tritan™ obtained from a polycyclohexylene dimethylene terephthalate copolyester resin, which is a resin having chemical resistance, minimal creep, heat resistance, electrical properties, self-extinguishing properties and light resistance, countermeasures for light degradation, heat degradation and hydrolysis reactions were investigated.

(a) Light Degradation

Countermeasures for light degradation were assessed by searching for ultraviolet absorbers suitable for PET, adding NOVAPEX® U-110 (manufactured by Mitsubishi Chemical Corporation), Seesorb™ 703 (manufactured by Shiraishi Calcium Kaisha, Ltd.), Seesorb™ 706 (manufactured by Shiraishi Calcium Kaisha, Ltd.), and Irganox® 1010 (manufactured by BASF Corporation) to the polycyclohexylene dimethylene terephthalate copolyester resin Tritan™, and checking the results.

These were selected not with the thinking that any ultraviolet absorber would suffice, but rather by selecting those ultraviolet absorbers initially deemed to be appropriate, subsequently determining their suitability, and then based on the results, determining whether there is a necessity to consider combining the material with another additive substance. An initial decision was made based on the results described below in (i).

(i) A UV absorber (UVa: Novapex® U-110 1%, UVb: Seesorb™ 703 0.25%+Irganox® 1010 0.25%) was added to TX2001, which is the injection molding grade of TX2000, the grade of Tritan™ having a heat resistance of 109° C. (HDT 0.455 MPa).

The initial Izod impact strength when UVa was added to TX2001 was a good result (551.3). When UVb was added to TX2001, a result about half of the result observed for UVa addition was obtained, and a sufficiently satisfactory result could not be obtained.

An accelerated weather resistance test was performed for the material containing the UVa added to TX2001 which had a good initial Izod impact strength. After 100 hours, yellowing was clearly visible (about 20 in a color difference measurement), and a sufficiently satisfactory result could not be obtained.

Further, even when the amount of UVa added to the TX2001 was increased to 2%, the value from the color difference measurement did not improve, and a sufficiently satisfactory result could not be obtained.

(ii) Next, a UV absorber (UVa: Novapex® U-110 1%, UVc: Seesorb™ 706+Irganox® 1010 0.25%) was added to TX1001, which is the injection molding grade of TX1000, the grade of Tritan™ having a heat resistance of 99° C. (HDT 0.455 MPa).

Even when UVa was added to the TX1001, the value from the color difference measurement did not improve, and a sufficiently satisfactory result could not be obtained.

Even when UVc was added to the TX1001, the value from the color difference measurement did not improve, and a sufficiently satisfactory result could not be obtained.

A conclusion was reached in the manner described below.

(iii) The ultraviolet absorbers that were initially thought to be capable of addressing the problem of light degradation were unable to address the problem, and therefore it was next thought that UV3638™ (manufactured by Sun Chemical Company Ltd.), which was found as a result of a second search, would be able to address the problem. 0.5% of UV3638™ was added to Tritan™ TX1001. The initial physical properties included a Charpy impact strength of NB (non-break) and a transmittance of about 90, indicating superior initial physical properties. An accelerated weather resistance test was performed, and even after 300 hours, almost no deterioration was observed in the Charpy impact strength or the transmittance, meaning a satisfactory result was able to be obtained.

In a test of a vehicle that is habitually left in an outdoor environment, 2000 hours of an accelerated weather resistance test is deemed to be equivalent to 10 years, and if the properties after 2000 hours are 85% of the initial properties, then they are deemed to be non-problematic. In the case of a helmet, which is not habitually left in an outdoor environment, if there are no problems with properties after 200 to 300 hours, then they are deemed to be non-problematic.

(b) Countermeasure for Hydrolysis Reaction

Requirement for hydrolysis inhibitor: it was thought that for a polycyclohexylene dimethylene terephthalate copolyester having ester bonds, for a material that is stable and exhibits chemical resistance under natural environmental conditions and under similar or harsher usage conditions, it is necessary to consider an environment in which water is present. Because substances are present that may undergo a hydrolysis reaction depending on the usage conditions, it is necessary to consider a countermeasure for preventing the occurrence of hydrolysis. For example, even if almost no hydrolysis occurs at normal temperature or low temperature in the presence of only water or even acid, hydrolysis may occur in the presence of only water under conditions of high temperature and high humidity, and in an environment in which an alkali component is also present, the hydrolysis is accelerated while being influenced by the concentration of the alkali component and the temperature.

(i) E-pellets of Carbodilite™ diluted with PET (manufactured by Nisshinbo Chemical Inc.) were added to Tritan™ TX1001 in an amount of 5% (by weight).

When the E-pellets were added to TX1001, the TX1001 and PET did not mix uniformly in the initial state, cloudiness occurred, the transmittance was unsatisfactory (a transmittance of about 80), and slight yellowing was observed, and therefore satisfactory results could not be obtained in terms of color difference and transmittance. However, almost no deterioration in the color difference or transmittance was observed upon 300 hours of an accelerated weather resistance test, meaning a result was obtained that indicated effectiveness in providing weather resistance.

(ii) Next, 0.5% (by weight) of Carbodilite™ in powder form LA-1 (manufactured by Nisshinbo Chemical Inc.) was added to Tritan™ TX1001.

When LA-1 was added to TX1001, the deterioration in transmittance due to cloudiness observed upon addition of the E-pellets was not observed, and the transmittance when LA-1 was added to TX1001 was 90%, compared with the approximately 88% transmittance of TX1001, meaning a satisfactory result was able to be obtained.

Almost no deterioration in transmittance was observed upon 300 hours of an accelerated weather resistance test, meaning that a satisfactory result was also able to be obtained for the weather resistance.

Because ester bonds are broken and light is absorbed when hydrolysis occurs, resulting in a deterioration in the transmittance, this result means that no hydrolysis is occurring.

In a Charpy impact test, the initial result was NB (non-break), but after 100 hours the strength had decreased dramatically, and a satisfactory result could not be obtained. It is thought that this is due to molecular chain breakage caused by ultraviolet radiation.

The standard for spectacles requires a lens transmittance of at least 85%.

(c) The above results clearly indicated that in order to make a polycyclohexylene dimethylene terephthalate copolyester stable and exhibit chemical resistance under natural environment conditions and usage conditions, the countermeasure for light degradation and the countermeasure for hydrolysis reactions proposed by the inventors of the present invention are effective as a countermeasure against light degradation and a countermeasure for preventing the occurrence of hydrolysis reactions. However, in order to achieve stability and chemical resistance under natural environment conditions and similar or harsher usage conditions, there is concern that is necessary to consider a countermeasure for temperature, a countermeasure for hot water, a countermeasure for the oxygen that is present in air, and a countermeasure for pollutants that are present in air, and the like. It could be said that alleviating this concern requires a material which is stable and exhibits chemical resistance under natural environment conditions and similar or harsher usage conditions when a countermeasure for light degradation and a countermeasure for preventing the occurrence of hydrolysis are implemented at the same time.

Accordingly, tests were performed using a combination of a light degradation countermeasure (addition of UV3638™ manufactured by Sun Chemical Company Ltd.) and a hydrolysis reaction inhibition countermeasure (addition of Carbodilite™ LA-1).

(i) UV3638™ 0.5% and LA-1 0.25% were added to Tritan™ TX1001, UV3638™ 0.5% and LA-1 0.25% were added to Tritan™ TX2001, and UV3638™ 0.25% and LA-1 0.25% were added to Tritan™ TX2001.

When UV3638™ and LA-1 were added to TX1001, the initial physical properties included a transmittance of about 87% and a Charpy impact strength of NB (non-break), indicating satisfactory results were able to be obtained.

Further, almost no deterioration in the transmittance or the Charpy impact strength was observed upon an accelerated weather resistance test of 300 hours, meaning satisfactory results could be obtained.

When UV3638™ and LA-1 were added to TX2001, the initial physical properties included a transmittance of about 87% and a Charpy impact strength of 70.9, indicating satisfactory results were able to be obtained.

Further, almost no deterioration in the transmittance or the Charpy impact strength was observed upon an accelerated weather resistance test of 300 hours, meaning satisfactory results could be obtained.

When amount of UV3638™ added to the TX2001 was halved, and the amount of LA-1 added was halved, the initial physical properties included a transmittance of about 88% and a Charpy impact strength of 66.5, indicating satisfactory results were able to be obtained.

Further, almost no deterioration in the transmittance or the Charpy impact strength was observed upon an accelerated weather resistance test of 300 hours, and the effects of the hydrolysis countermeasure (addition of Carbodilite™ LA-1), and the combination of the light degradation countermeasure and the hydrolysis countermeasure were compared.

With the light degradation countermeasure, the initial properties for the Charpy impact strength and the transmittance were high, and almost no deterioration was observed even after 300 hours of an accelerated weather resistance test.

With the hydrolysis countermeasure, the initial properties for the Charpy impact strength and the transmittance were high, but after 3000 hours of an accelerated weather resistance test, although almost no deterioration was observed in the transmittance, the Charpy impact strength decreased dramatically.

With the combination of the light degradation countermeasure and the hydrolysis countermeasure, the initial properties for the Charpy impact strength and the transmittance were high, and almost no deterioration was observed even after 300 hours of an accelerated weather resistance test. Moreover, an improvement in the tensile characteristics was also observed, and almost no deterioration was observed even after 300 hours of an accelerated weather resistance test, meaning satisfactory results were able to be achieved.

It is evident that this result is not only due to the simple combination of the light degradation countermeasure and the hydrolysis countermeasure, but also because a special effect can be obtained which yields superior weather resistance as a result of a synergistic effect between the light degradation countermeasure and the hydrolysis countermeasure.

TABLE 4

| | TX1001 Clear | | | TX1001 Clear-2 | | | TX1001 Clear-3 | | | TX1001 Clear-4 | | | TX1001 Clear-5 | | | TX1001 Blueing | | | TX1001 Blueing-2 | | | TX2001 Blueing-3 | | | TX2001 Blueing-4 | | |
|---|---|---|---|---|---|---|---|---|---|---|---|---|---|---|---|---|---|---|---|---|---|---|---|---|---|---|---|
| Weather resistance test, presence of rain | no rain | | | no rain | | | no rain | | | no rain | | | no rain | | | no rain | | | no rain | | | no rain | | | no rain | | |
| Resin grade TX1001 | 100 | | | 100 | | | 100 | | | 100 | | | 100 | | | 100 | | | 100 | | | | | | | | |
| TX2001 | | | | | | | | | | | | | | | | | | | | | | 100 | | | 100 | | |
| Color | | | | | | | | | | | | | | | | Blueing | | | Blueing | | | Blueing | | | Blueing | | |
| Ultraviolet absorber UVa | 1 | | | 1 | | | | | | | | | | | | | | | | | | | | | | | |
| UVb | | | | | | | | | | | | | | | | | | | | | | | | | | | |
| UVc | | | | | | | | | | | | | | | | | | | | | | | | | | | |
| UV-3638 ™ | | | | | | | | | | | | | | | | | | | | | | | | | | | |
| Antioxidant Irganox @ 1010 | 0.45 | | | 0.45 | | | | | | | | | 0.5 | | | 0.5 | | | 0.5 | | | 0.5 | | | 0.25 | | |
| Heat resistor Irgafos @ 168 | 0.15 | | | 0.15 | | | | | | | | | | | | | | | | | | | | | | | |
| Hydrolysis inhibitor | | | | | | | | | | | | | | | | | | | | | | | | | | | |
| Carbodilite ™ E-pellets | | | | 5 | | | 5 | | | 0.5 | | | | | | | | | | | | | | | | | |
| Carbodilite ™ LA-1 | | | | | | | | | | | | | | | | | | | 0.25 | | | 0.25 | | | 1.25 | | |

| | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm |
|---|---|---|---|---|---|---|---|---|---|---|---|---|---|---|---|---|---|---|---|---|---|---|---|---|---|---|---|
| Color difference 100 Hr | 15.6 | 15.1 | 10.1 | 15.1 | 14.5 | 12.8 | 2.9 | 2.8 | 2.9 | 4.5 | 4.2 | 3.4 | 0.5 | 0.7 | 0.8 | 1.9 | 0.7 | 0.5 | 0.3 | 0.2 | — | 1.7 | 0.7 | 0.2 | 0.3 | | |
| 200 Hr | 21 | 19.4 | 14.8 | 19.5 | 18.7 | 15 | 4.1 | 3.8 | 4.5 | 6.5 | 6.4 | 5.8 | 1.5 | 1.5 | 1.8 | 2.8 | 1.6 | 2 | 2.2 | 2.2 | 1.5 | 2.1 | 2.1 | 2.1 | 2.2 | | |
| 300 Hr | 23.5 | 21.3 | 16.5 | 21 | 20.5 | 16.4 | 5.5 | 5.2 | 5.9 | 9.3 | 9.2 | 8.1 | 3.1 | 3.2 | 3.4 | 4.2 | 3.1 | 2.7 | 3.1 | 2.7 | 2.2 | 3 | 2.7 | 2.5 | 4.1 | | |
| evaluation | X | | | X | | | | | | | | | | | | | | | | | | | | | | | |
| Transmittance 0 Hr | 89.3 | 91.1 | | 79.2 | 84.8 | | 73.3 | 81.4 | 86.2 | 89.7 | 90.1 | 90.6 | 89.5 | 90.3 | *** | 88.8 | 89.7 | 87.8 | 89.2 | 87.9 | 86.7 | 89.3 | 86.8 | 88.2 | 89.5 | | |
| 100 Hr | 84.3 | 88.1 | | 73.5 | 80.5 | | 72.2 | 80.5 | 86.6 | 88.5 | 89.3 | 90.1 | 88.8 | 89.5 | 90.1 | 88.1 | 89.4 | 86.9 | 88.4 | 87.8 | — | — | 86.9 | 88.1 | 89.6 | | |
| 200 Hr | 80.7 | 87.4 | | 71.5 | 77.7 | | 72.4 | 80.6 | 85.6 | 87.8 | 88.7 | 89.7 | 89.3 | 90.4 | 90.9 | 88.7 | 89.7 | 87.2 | 86.5 | 86.7 | 84.9 | 87.4 | 85.6 | 86.7 | 88.9 | | |
| 300 Hr | 79.6 | 87.3 | | 69.4 | 80.2 | | 72.4 | 81.1 | 84.9 | 88.3 | 89.1 | 89.9 | 88.2 | 89.3 | 89.7 | 87.7 | 89.1 | 85.9 | 86.4 | 87.5 | 84.2 | 86.8 | 84.6 | 87.8 | 87 | | |
| evaluation | X | | | X | | | | | | | | | | | | | | | | | | | | | | | |
| Tensile breaking strain 0 Hr | 125.4 | | | 133 | | | 126.7 | | | 125.5 | | | 128.9 | | | 126.7 | | | 125.6 | | | 102 | | | 98.2 | | |
| 100 Hr | 80.2 | | | 69 | | | 91.3 | | | 46.1 | | | 66.6 | | | 84.4 | | | 98.4 | | | 55 | | | 59.1 | | |
| 200 Hr | 67.4 | | | 56.3 | | | 60.6 | | | 9.3 | | | 26.8 | | | 50.4 | | | 86.6 | | | 34.9 | | | 22.5 | | |
| 300 Hr | 38.1 | | | 32.4 | | | 59.1 | | | 6.4 | | | 12.3 | | | 9.7 | | | 52.5 | | | 22.3 | | | 19.5 | | |
| evaluation | Δ | | | Δ | | | Δ | | | Δ | | | Δ | | | Δ | | | Δ | | | Δ | | | Δ | | |
| Charpy impact 0 Hr | 80.8 | | | NB | | | NB | | | NB | | | NB | | | 80.3 | | | NB | | | 70.9 | | | 66.5 | | |
| 100 Hr | NB | | | NB | | | NB | | | NB | | | NB | | | NB | | | NB | | | 67.6 | | | 64.6 | | |
| 200 Hr | 4.6 | | | 6.1 | | | 6.6 | | | 8.5 | | | 41.9 | | | 80.2 | | | NB | | | 64.2 | | | 64.4 | | |
| 300 Hr | 13.6 | | | 18.3 | | | 18 | | | 22.7 | | | 80.3 | | | NB | | | NB | | | 65.9 | | | 56.1 | | |
| evaluation | X | | | X | | | X | | | X | | | ○ | | | ○ | | | ○ | | | ○ | | | ○ | | |
| Overall evaluation | X | | | X | | | X | | | X | | | ○ | | | ○ | | | ○ | | | ○ | | | ○ | | |

TABLE 5

| | | TX1001/2001 UVa | | | TX2001 UVa | | | TX2001 UVb | | | TX1001 UVcW1 | | | TX1001 Clear | | |
|---|---|---|---|---|---|---|---|---|---|---|---|---|---|---|---|---|
| Weather resistance test, presence of rain | | rain present | | | rain present | | | rain present | | | rain present | | | rain present | | |
| Resin grade | TX1001 | 60 | | | | | | | | | 100 | | | 100 | | |
| | TX2001 | 40 | | | 100 | | | 100 | | | | | | | | |
| Color | | | | | | | | | | | white (2 wt %) | | | | | |
| Ultraviolet absorber | UVa | 1 | | | 1 | | | | | | | | | 1 | | |
| | UVb | | | | | | | 1 | | | | | | | | |
| | UVc | | | | | | | | | | 1 | | | | | |
| | UV-3638™ | | | | | | | | | | | | | | | |
| Antioxidant Irganox® 1010 | | | | | | | | | | | | | | 0.45 | | |
| Heat resistor Irgafos® 168 | | | | | | | | | | | | | | 0.15 | | |
| Hydrolysis inhibitor Carbodilite™ E-pellets Carbodilite™ LA-1 | | | | | | | | | | | | | | | | |
| | | 3 mm | 2 mm | 1 mm | 3 mm | 2 mm | 1 mm | 3 mm | 2 mm | 1 mm | 3 mm | 2 mm | 1 mm | 3 mm | 2 mm | 1 mm |
| Color difference | 100 Hr | 30.5 | 28.6 | 19.3 | 26.2 | 18.7 | 15.6 | 12.2 | 19.7 | 11.9 | 0.4 | 0.3 | 0.7 | 1.1 | 1.1 | 0.9 |
| | 200 Hr | 30.7 | 26.1 | 18 | 23.4 | 22.3 | 18.6 | 13 | 19 | 12.9 | 0.8 | 0.8 | 1.3 | 2.3 | 2.3 | 2.1 |
| | 300 Hr | 30.2 | 26.5 | 20.7 | 27.3 | 20.1 | 17.5 | 14 | 23.6 | 17.4 | 2.6 | 5.6 | 3.6 | 3.5 | 3.2 | 3.2 |
| | evaluation | | X | | X | | | X | | | X | | | X | | |
| Transmittance | 0 Hr | | | | | | | 87.9 | 88.8 | 89.8 | | | | | | |
| | 100 Hr | | | | | | | 76.9 | 80.6 | 85.3 | | | | | | |
| | 200 Hr | | | | | | | 73.9 | 78.4 | — | | | | | | |
| | 300 Hr | | | | | | | 75.9 | 80.7 | 85.8 | | | | | | |
| | evaluation | | — | | — | | | — | | | — | | | — | | |
| Tensile breaking strain | 0 Hr | | 164.5 | | | 130.5 | | | 124.8 | | | | | | 128.6 | |
| | 100 Hr | | | | | | | | | | | | | | 49.9 | |
| | 200 Hr | | | | | | | | | | | | | | 13.7 | |
| | 300 Hr | | | | | | | | | | | | | | 4.1 | |
| | evaluation | | — | | — | | | — | | | — | | | Δ | | |
| Charpy impact strength kJ/m² | 0 Hr | | 78.2 | | | 55.1 | | | 23.2 | | | | | | NB | |
| | 100 Hr | | | | | | | | | | | | | | 40.7 | |
| | 200 Hr | | | | | | | | | | | | | | 8.3 | |
| | 300 Hr | | | | | | | | | | | | | | 12.1 | |
| | evaluation | | — | | — | | | X | | | — | | | X | | |

A target product can be produced by preparing a composition containing an ultraviolet absorber composed of a benzoxazinone and a hydrolysis inhibitor composed of a carbodiimide in a polycyclohexylene dimethylene terephthalate copolyester, and subsequently performing injection molding.

For the ultraviolet absorber composed of a benzoxazinone-based compound, the ultraviolet absorber UV-3688™ manufactured by Cytec Industries Inc. is added in an amount from 0.25 to 0.5% by weight. Other benzoxazinone-based compounds are disclosed in JP 2005-507006 A, JP 2006-182980 A, and JP 2001-055391 A. These compounds can also be used in the same manner.

For the hydrolysis inhibitor composed of a carbodiimide, LA-1 manufactured by Nisshinbo Chemical Inc. is added in an amount from 0.25 to 0.5% by weight. Compounds disclosed in JP 3,122,485 B and JP 3,388,990 can be used.

Although the above treatment measures represent the main treatments, treatment with an antioxidant and a heat-resistant material in combination with these measures is effective.

Treatment with an antioxidant and a heat-resistant material is as described below.

Tritan™ TX1001 is treated with an antioxidant by adding 0.45% by weight of the hindered phenol-based antioxidant Irganox® 1010 manufactured by BASF Corporation.

Irganox® 1010 is a representative phenol-based antioxidant that is effective in improving the heat resistance of all resins and elastomers.

In those cases where excellent process heat stability is also required, treatment is performed with an antioxidant to which 0.45% of the hindered phenol-based antioxidant Irganox® 1010 has been added in combination with a phosphorus-based or lactone-based process heat stabilizer. Irganox® 1010 has an intrinsically high molecular weight, meaning it has low extractability and low volatility, and it can therefore be used widely, from thin items through to thick items.

The phosphorus-based process heat stabilizer Irgafos® 168 manufactured by BASF Corporation is added to the aforementioned Tritan™ TX1001 in an amount of 0.15%, and used as a heat resistance treatment agent. Irgafos® 168 is a phosphorus-based process stabilizer that is currently firmly established as a leading process stabilizer. The purity is extremely high, and it exhibits excellent hydrolysis resistance and volatility resistance.

It can be used in numerous resins, including polyolefin-based resins, styrene-based resins, polycarbonate, polyester and polyamide. Irgafos® 168 is used as a heat resistance treatment agent for polycyclohexylene dimethylene terephthalate copolyester, which is one type of polyester. Use in combination with a phenol-based antioxidant is normally recommended.

Test methods for confirming the effects of the present invention are described below in detail. The test methods are not limited to those described here, and any method that enables the test results to be checked, and enables content measurement that can withstand evaluation can be used.

The shape of the test pieces used in each of the tests is as illustrated in FIG. 1. A dumbbell-shaped test piece 11 has a width of 20 mm and a length of 150 mm. A 3-step plate-shaped test piece 12 also has a width of 20 mm and a length of 150 mm.

(1) Chemical Resistance Test

The chemical resistance test is performed based on "Plastics—Testing methods for determining the effect of immersion in liquid chemicals (JIS K 7114)". The test piece (surface area 60 mm×60 mm, thickness 1.0 mm to 1.1 mm) is immersed in the prescribed test reagent liquid (temperature of test reagent liquid 23° C.+2° C.), and is removed following a prescribed period of time (20, 200 or 2000 hours). The mass, dimensions and external appearance of the test piece are checked before and after immersion.

(2) Weather Resistance Test

The weather resistance test is performed based on "Plastics—Methods of exposure to laboratory light sources (JIS K 7350-2)".

Figure 2:
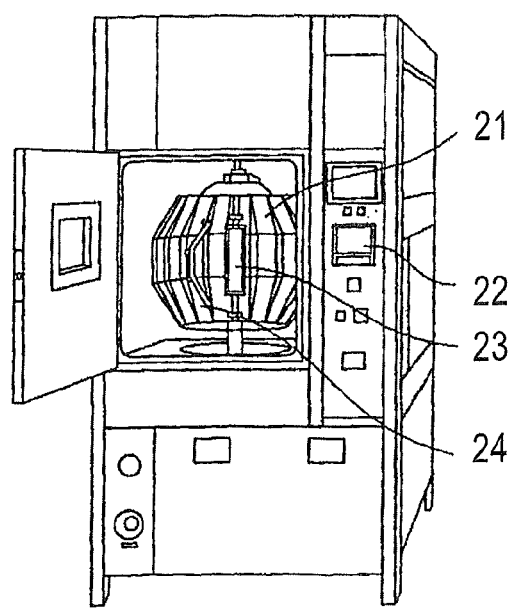
FIG. 2 is a diagram illustrating an apparatus for an accelerated weather resistance test.

Test pieces (dumbbell-shaped and 3-step plate-shaped) are installed in an accelerated weather resistance tester (Super Xenon Weather Meter SX-75 manufactured by Suga Test Instruments Co., Ltd., FIG. 2) that uses a xenon lamp 23 as a light source, conditions are set using a control panel 22, and testing is then performed.

Following a prescribed period of time (100, 200 or 300 hours), the test pieces are removed, and the changes in the physical properties of the test pieces before and after the weather resistance test are checked using the evaluation tests described below (described below in (3) to (8)). The operating conditions for the tester are input so that the outdoor light filter is installed, the temperature inside the tank is not controlled, the humidity inside the tank is 50+5%, and the black panel temperature is 63+3° C. Further, in the case of the "rain present" tests that simulate rainfall, the water spray cycle from a water spray port 24 is set so that spraying is conducted for 18 minutes and then halted for 102 minutes.

In a test of a vehicle that is habitually left in an outdoor environment, 2000 hours of the accelerated weather resistance test is deemed to be equivalent to 1 year, and if the properties after 2000 hours are 85% of the initial properties, then they are deemed to be non-problematic. In the case of a helmet, which is not habitually left in an outdoor environment, maintenance of the transmittance and the Charpy impact strength after 300 hours is deemed to indicate weather resistance.

(3) Color Difference Measurement

Figure 3:
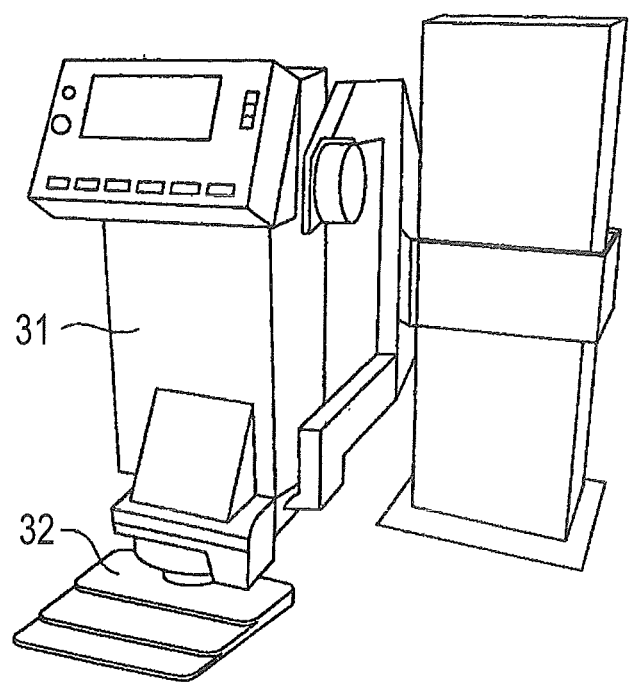
FIG. 3 is a diagram illustrating an apparatus for a color difference measurement test.

Color difference measurements are performed based on "Testing methods for optical properties of plastics (HS K 7105)" (FIG. 3).

Test pieces (dumbbell-shaped and 3-step plate-shaped) are each placed in an arbitrary position beneath the measurement head of a color difference measurement apparatus (CM-508d.31 manufactured by Minolta Co., Ltd.), the measurement head is brought into contact with the measurement surface of the test piece, and spectrophotometric colorimetry (SCE) is used to measure the surface color (L*a*b* color system) of the test piece using a light source D65 and a viewing angle of 2°. Using the surface color of a test piece that has not been subjected to the accelerated weather resistance test as a standard, the color difference ΔE*ab from the surface color of the test piece after the accelerated weather resistance test is determined.

A color difference measurement value of 3 or more is an indication of the level of color difference that can be sensed by visual inspection.

(4) Gloss Measurement

Figure 4:
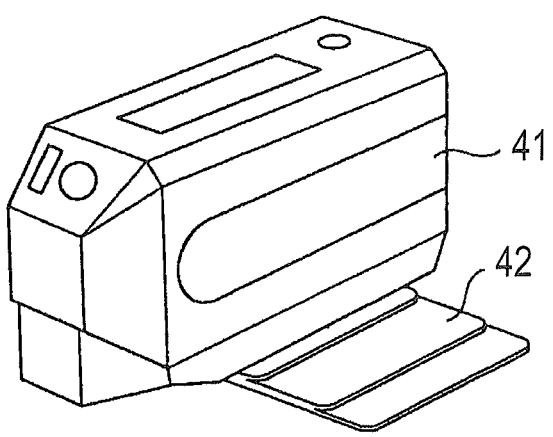
FIG. 4 is a diagram illustrating an apparatus for a gloss measurement test.

Gloss measurements are performed based on "Testing methods for optical properties of plastics (HS K 7105)" (FIG. 4).

Test pieces (dumbbell-shaped and 3-step plate-shaped) are each placed on a flat base 42, the measurement head of a gloss meter (GM-60 manufactured by Minolta Co., Ltd.) is brought into contact with the measurement surface of the test piece, and the gloss (60 degree specular gloss) is measured.

(5) Visible Transmittance Measurement

Figure 5:
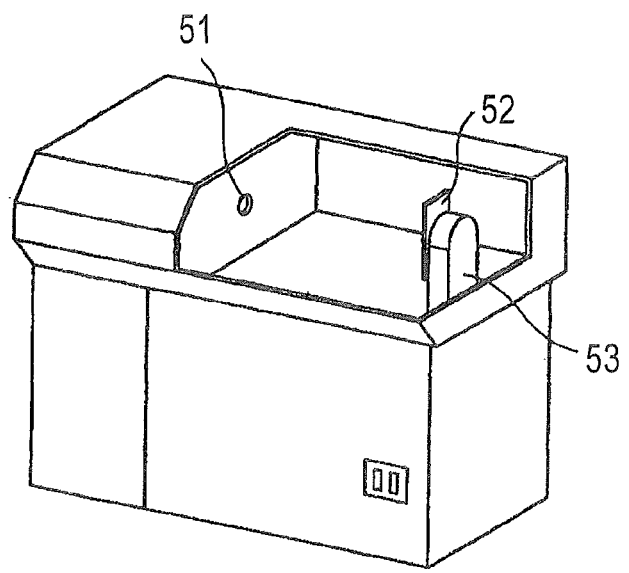
FIG. 5 is a diagram illustrating an apparatus for a total light transmittance test.

Visible transmittance measurements are performed based on "Testing methods for optical properties of plastics (JIS K 7105)" (FIG. 5).

Test pieces (dumbbell-shaped and 3-step plate-shaped) are each installed in a test piece installation location in front of the light receiving section of a recording spectrophotometer (U-4100 manufactured by Hitachi High-Technologies Corporation), and the spectral transmittance is measured in the wavelength region from 380 nm to 780 nm at a scan speed of 600 nm/min and a sampling interval of 1.00 nm (53). The measured spectral transmittance is converted to (visual) transmittance (using the conversion formula of JIS T8147), and this value is checked.

The standard for spectacles requires a lens transmittance of at least 85%, and therefore the pass line for transmittance is deemed to be 85% or higher.

(6) Tensile Test

Figure 6:
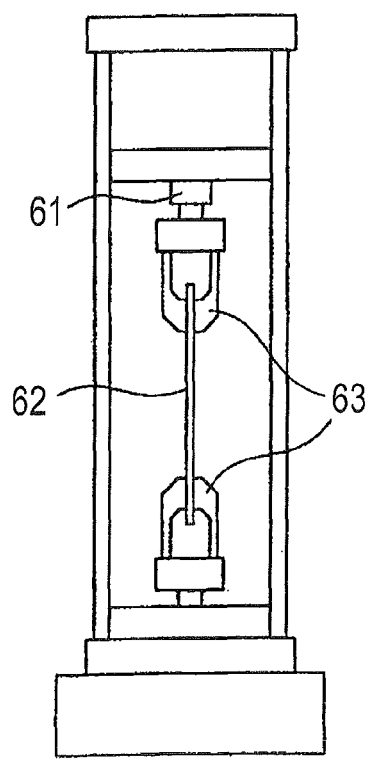
FIG. 6 is a diagram illustrating a tensile test apparatus.

Tensile tests were performed based on "Plastics—Test methods for tensile properties, part 2: test conditions for molded, extrusion molded and injection molded plastics (JIS K 7162)" (FIG. 6).

Test pieces (dumbbell-shaped and 3-step plate-shaped) are each sandwiched between an upper chuck 63 and a lower chuck 63 of a tensile tester (RTC-1310A manufactured by Toyo Seiki Seisaku-sho, Ltd.), and then attached to the tester. The lower chuck is moved downward at a rate of 50 mm/min until the test piece breaks. The tensile yield stress, the tensile yield strain, the tensile breaking strength, and the tensile breaking strain are checked.

(7) Flexural Properties Test

Figure 7:
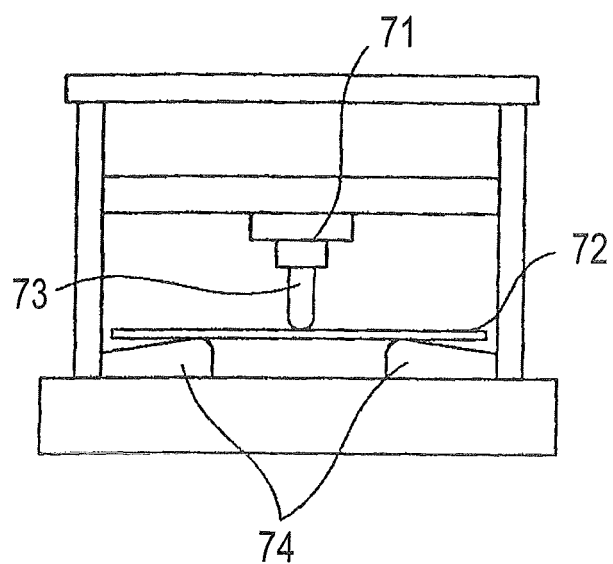
FIG. 7 is a diagram illustrating an apparatus for a flexural property test

Flexural properties tests are performed based on "Plastics—Determination of flexural properties (JIS K 7171)" (FIG. 7).

A test piece (processed to dimensions of 80×10×2 mm by cutting both ends from a dumbbell-shaped test piece) is installed on a support platform 74 (span between support points of 34 mm) of a flexion tester (RTC-1310A manufactured by Toyo Seiki Seisaku-sho, Ltd.) with the surface that has been irradiated with the xenon lamp in the accelerated weather resistance test facing upward. The test piece is then pushed down from above and deformed by an indenter 73 at a rate of 1 mm/min. The flexural strength and the flexural modulus are checked.

(8) Charpy Impact Strength Test

Charpy impact strength tests are performed based on "Plastics—Determination of Charpy impact properties—part 1: non-instrumental impact test (JIS K 7111-1)" (FIG. 8).

A dumbbell-shaped test piece is processed in advance to form a shape conforming to ISO 179/1eA (processed to dimensions of 80×10×2 mm by cutting both ends from a dumbbell-shaped test piece, and a notch then formed in the center). The test piece is installed on a support base 83 of a Charpy impact tester (DG-CB manufactured by Toyo Seiki Seisaku-sho, Ltd.), a hammer having so-called pendulum energy of 4.00 J is used to strike the test piece with a rising angle of 150°, and the Charpy impact strength is checked.

The pass line for the Charpy impact strength is deemed to be a numerical value following the accelerated weather resistance test that is 90% or more of the initial value.

The test results confirming the effects are disclosed below. The present invention is not limited by these results. Unless stated otherwise, % represents % by weight.

Example 1

A. Use of Light Degradation Inhibitors as Weather Resistance Agents

Light degradation inhibitors include both those cases in which "light" is deemed to refer to ultraviolet inhibitors, and those cases which consider infrared radiation. Assuming ultraviolet inhibitors, numerous inhibitors are known.

In the case of UVa (Novapex® U-110, manufactured by Mitsubishi Chemical Corporation), UVb (Irganox®, manufactured by BASF Corporation) and UVc (Seesorb™ 706, manufactured by Shiraishi Calcium Kaisha, Ltd.), satisfactory results could not be obtained in terms of color difference, transmittance, Charpy impact strength and tensile breaking strength, and a judgment was made that the materials had no effect.

The ultraviolet absorber UV-3638™ (manufactured by Sun Chemical Company Ltd.), which is an oxazinone-based compound, yields no deterioration in transmittance and no fluctuation in the Charpy impact strength, and was adjudged to be effective for use as a light degradation inhibitor.

Although there was no problem in terms of the Izod impact strength, the conclusion was reached that this material could not be used on its own. Use of a light degradation inhibitor was not a major factor.

Example 2

B. Use of Hydrolysis Inhibitors as Weather Resistance Agents

Whether or not stable substances such as Tritan™ are prone to hydrolysis reactions under usage conditions was unclear. On the other hand, when used in environments where water exists, polycyclohexylene dimethylene terephthalate copolyesters having ester bonds have a property of undergoing hydrolysis depending on the environmental conditions, and therefore instituting countermeasures to prevent hydrolysis is necessary. For example, even if almost no hydrolysis occurs at normal temperature or low temperature in the presence of only water or even acid, hydrolysis may occur in the presence of only water under conditions of high temperature and high humidity, and under conditions in which an alkali component is also present, it is said that the hydrolysis is accelerated while being influenced by the concentration of the component and the temperature.

(a) 5% of E-pellets of Carbodilite™ diluted with PET (manufactured by Nisshinbo Chemical Inc.) was added to Tritan™ TX1001.

When the E-pellets were added to TX1001, the TX1001 and PET did not mix uniformly in the initial state, cloudiness occurred, the transmittance was unsatisfactory (a transmittance of about 80), and slight yellowing was observed, and therefore sufficiently satisfactory results could not be obtained in terms of color difference and transmittance, but almost no deterioration in the color difference or transmittance was observed upon 300 hours of an accelerated weather resistance test, meaning a result could be obtained that indicated effectiveness in providing weather resistance.

(b) Next, 0.5% of Carbodilite™ in powder form LA-1 (manufactured by Nisshinbo Chemical Inc.) was added to Tritan™ TX1001.

When LA-1 was added to TX1001, the deterioration in transmittance due to cloudiness observed upon addition of the E-pellets was not observed, and the transmittance when LA-1 was added to TX1001 was 90%, compared with the approximately 88% transmittance of TX1001, meaning a satisfactory result was able to be obtained.

Almost no deterioration in the transmittance was observed upon 300 hours of an accelerated weather resistance test, meaning that a satisfactory result was also able to be obtained for the weather resistance.

Because ester bonds are broken and light is absorbed when hydrolysis occurs, resulting in a deterioration in the transmittance, this result means that no hydrolysis is occurring.

In a Charpy impact test, the initial result was NB (non-break), but after 100 hours the strength had decreased dramatically, and a satisfactory result could not be obtained. It is thought that this is due to molecular chain breakage caused by ultraviolet radiation.

In terms of the effects on Tritan™, although there was no problem in terms of the transmittance, the low Charpy impact strength was a problem, and a conclusion was reached that a hydrolysis inhibitor could not be used as the main factor.

Example 3

Use of Heating Inhibitors as Weather Resistance Agents

Heating activates substances, and therefore heating operations can be thought of as providing an effective action. However, preventing heating can often contribute to the stabilization of substances. A determination was to made as to what type of result could be obtained by using a light degradation inhibitor and a hydrolysis inhibitor as substances having a heating factor with a stable substance such as Tritan™.

Next, comparison of the results for a light degradation countermeasure (addition of UV3638™ manufactured by Sun Chemical Company Ltd.), a hydrolysis countermeasure (addition of Carbodilite™ LA-1), and a combination of the light degradation countermeasure and the hydrolysis countermeasure revealed the following.

In terms of the light degradation countermeasure, the initial properties for the Charpy impact strength and the transmittance were high, and even after 300 hours of an accelerated weather resistance test, almost no deterioration was observed.

In terms of the hydrolysis countermeasure, the initial properties for the Charpy impact strength and the transmittance were high, and after 300 hours of an accelerated weather resistance test, although almost no deterioration in the transmittance was observed, the Charpy impact strength had decreased dramatically.

On the other hand, in the case of the combination of the light degradation countermeasure and the hydrolysis countermeasure, the initial properties for the Charpy impact strength and the transmittance were high, and even after 300 hours of an accelerated weather resistance test, almost no deterioration was observed. Moreover, an improvement in the tensile characteristics was observed, and almost no deterioration was observed even after 300 hours of an accelerated weather resistance test, meaning satisfactory results were able to be obtained.

It can be said that this result is not only due to the simple combination of the light degradation countermeasure and the hydrolysis countermeasure, but also because a special effect can be obtained which yields superior weather resistance (heating prevention) as a result of a synergistic effect between the light degradation countermeasure and the hydrolysis countermeasure.

Based on the above results, a transparent resin composition can be obtained which is stable and has weather resistance and chemical resistance under natural environmental conditions and under similar or harsher usage conditions, the composition comprising a polycyclohexylene dimethylene terephthalate copolyester, an ultraviolet absorber composed of a benzoxazinone-based compound, and a hydrolysis inhibitor composed of a carbodiimide.

Example 4

Although the above treatment measures represent the main treatments, it was confirmed that treatment with an antioxidant and a heat-resistant material is also effective.

The treatment with an antioxidant and a heat-resistant material was performed as follows.

Tritan™ TX1001 was treated with an antioxidant by adding 0.45% by weight of the hindered phenol-based antioxidant Irganox® 1010 manufactured by BASF Corporation. Irganox® 1010 is a representative phenol-based antioxidant that is effective in improving the heat resistance of all resins and elastomers.

In those cases where excellent process heat stability is also required, a phosphorus-based or lactone-based process heat stabilizer may also be used. Treatment was performed using an antioxidant to which 0.45% of the hindered phenol-based antioxidant Irganox® 1010 had been added. Irganox® 1010 has a high molecular weight, meaning it has low extractability and low volatility, and it can therefore be used widely, from thin items through to thick items.

The phosphorus-based process heat stabilizer Irgafos® 168 manufactured by BASF Corporation was added to the aforementioned Tritan™ TX1001 in an amount of 0.15%, and used as a heat resistance treatment agent. Irgafos® 168 is a phosphorus-based process stabilizer that is currently firmly established as a leading process stabilizer. The purity is extremely high, and it exhibits excellent hydrolysis resistance and volatility resistance.

It can be used in numerous resins, including polyolefin-based resins, styrene-based resins, polycarbonate, polyester and polyamide. Irgafos® 168 is used as a heat resistance treatment agent for polycyclohexylene dimethylene terephthalate copolyester, which is one type of polyester. Use in combination with a phenol-based antioxidant is normally recommended.

Example 5

Using this transparent resin composition, helmets, face shields for helmets, lenses for spectacles, frames and templates for spectacles, outer cases for storing items, sheet materials for outdoor installation, and gear materials having lubrication performance for use in small precise gears can be obtained.

Figure 9:
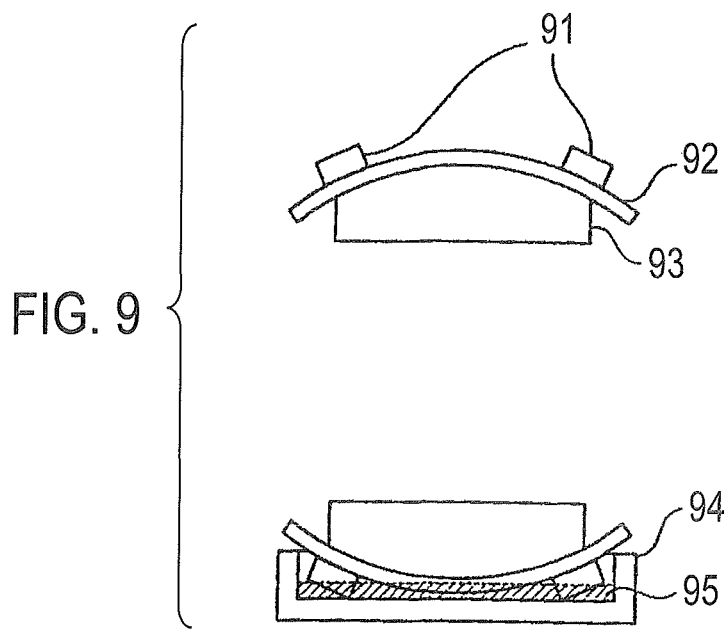
FIG. 9 is a diagram illustrating an apparatus for an environmental stress crack test.
Figure 10:
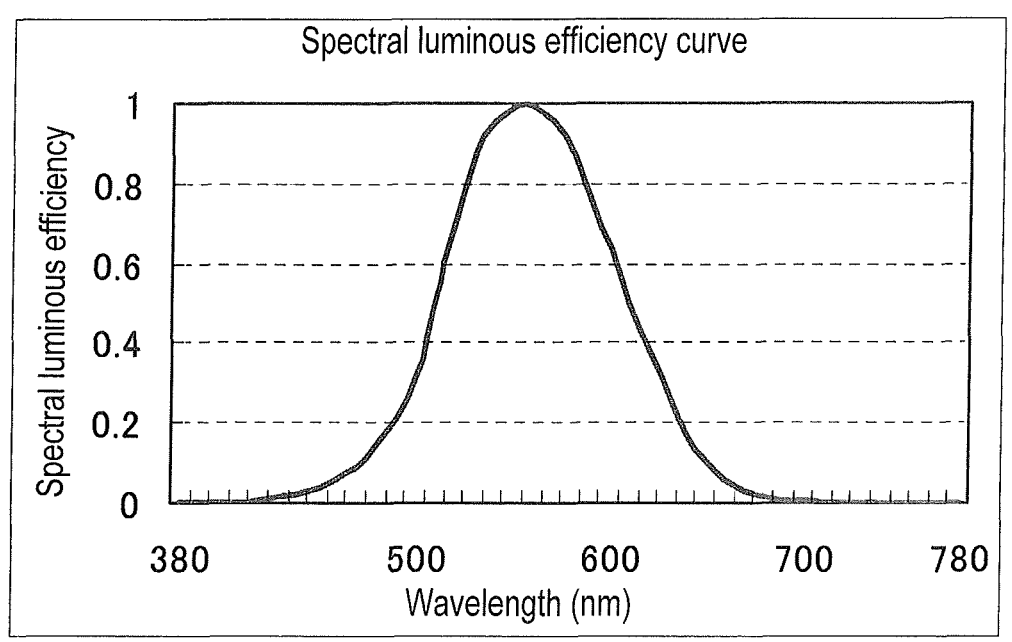
FIG. 10 is a diagram illustrating the results of measuring visible transmittance.
Figure 11:
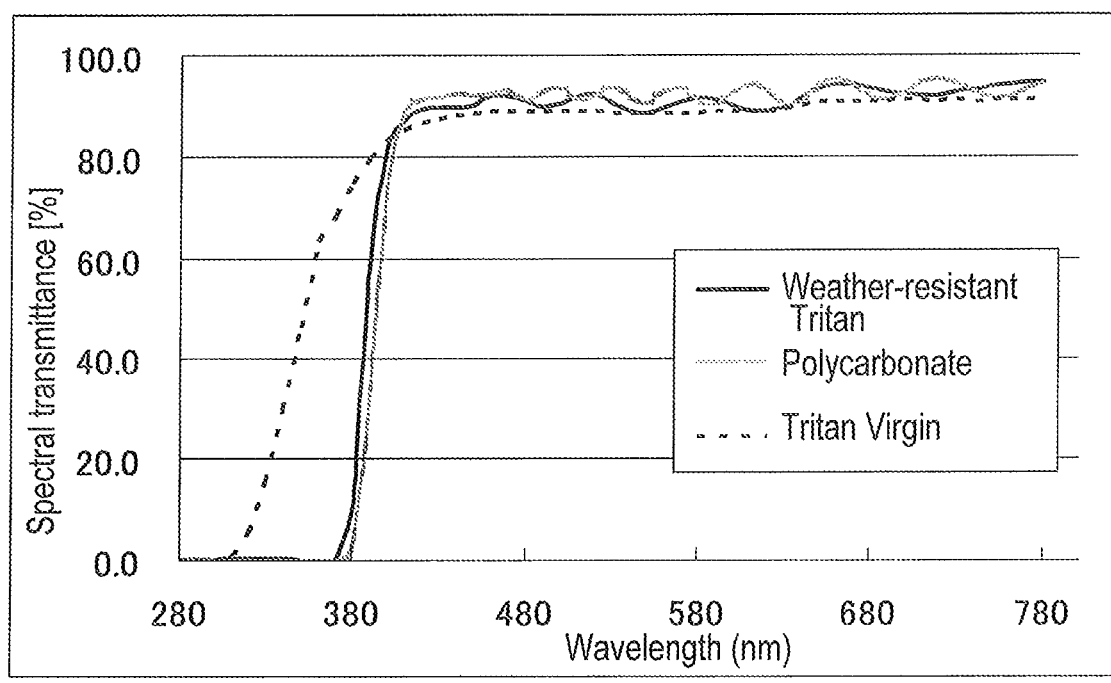
FIG. 11 is a diagram illustrating the results of measuring total light transmittance.

Test methods that yielded results in other specific examples are described below. Environmental stress crack test (FIG. 9)

In an environmental stress crack test, a test piece (dumbbell-shaped) is attached to a fixed strain jig 93 using fasteners 91. The fixed strain jig 93 has a semicircular surface in cross-section, and the curved surface is designed so that the center of the attached test piece is subjected to a constant flexural strain (1.0%) (upper figure).

In the test method, the fixed strain jig is inverted (lower figure) and placed in the recessed portion of a chemical receptacle 94. A chemical substance 95 is placed in the recess of the chemical receptacle so that the test piece makes contact with the chemical substance, and the test piece is left in this state for 3 hours at room temperature. The test piece is then removed, washed thoroughly and dried, and the mass, dimensions and external appearance of the test piece are checked before and after immersion.

When the results of the test yield a test piece with no cracks, the tensile breaking strain (tensile breaking strain, tensile breaking elongation) is also checked. The tests are performed in the same manner as (6) Tensile test, based on "Plastics—Test methods for tensile properties, part 2: test conditions for molded, extrusion molded and injection molded plastics (JIS K 7162)". The test piece (dumbbell-shaped) is sandwiched between the upper chuck and the lower chuck of a tensile tester (RTC-1310A manufactured by Toyo Seiki Seisaku-sho, Ltd.), and is then attached to the tester. The lower chuck is moved downward at a rate of 50 mm/min until the test piece breaks, and the tensile breaking strain is checked. By measuring the breaking elongation, effects of the chemical substance that do not appear on the external appearance are checked.

Evaluation criteria: the breaking elongation of the test piece that has been subjected to the operation of contact with the chemical substance or the like is represented as a percentage relative to a value of 100 for the breaking elongation of a test piece of the same material that has not undergone pretreatment by contact with the chemical substance or the like, and the percentage is evaluated as follows.

OO: 85% or more
O: 70% or more but less than 85%
Δ: 30% or more but less than 70%
x: less than 30%, or broke, meaning the tensile test could not be performed In the case of whitening, yellowing or cloudiness, the evaluation was lowered one grade.

Example 6

The environmental stress crack test is one chemical resistance test for checking environmental stress cracking (environmental stress fissures). Environmental stress cracks may occur, even if the chemical substance has no effect or minimal effect when adhered to a resin, when the chemical substance is adhered in a state where a force is applied (such as internal stress during molding or an external force such as a fastening stress), which may produce an effect in a short period of time or have an increased effect. Cracking that occurs in this manner due to force and a chemical substance is termed environmental stress cracking, and this test checks for the presence of environmental stress cracks.

In this test, extremely severe conditions are set in order to make the differences in chemical resistance of the resins more marked. It is extremely difficult to imagine that the resin would be in a state of continuous contact with a chemical substance for 3 hours. Further, the effect of environmental stress cracking increases as the forces on the resin are increased. In the case of a polycarbonate, if the test piece is subjected to a strain of 1.0%, then the internal stress is estimated to be 23 MPa. In documentation from resin makers, a residual stress of 8.3 Mpa is deemed a "strain check for a stand-alone molded item", meaning a force much larger than this has been applied.

The inventors of the present invention checked the physical properties of polycyclohexylene dimethylene terephthalate copolyester resin and the environmental stress cracking of Tritan™ (product name). The results are as shown below.

absorber UV-3638™, and 0.25% of the hydrolysis inhibitor Carbodilite™ LA-1. The weather resistance was verified for the case where the amounts added were each reduced by half, to 0.25% and 0.125% respectively. Test pieces were prepared in 3 colors, namely white, transparent blue and transparent green (White, C-Blue, C-green), either with the standard amounts added (T1) or with the amounts added halved (T2), and these test pieces were then evaluated.

TABLE 6

|  | Resin | Change in external appearance | Comparison of physical properties [%] | | Evaluation |
|---|---|---|---|---|---|
|  |  |  | Weight | Tensile breaking elongation |  |
| Ammonia water | TX1001 | no anomalies | 100 | 101.3 | ⊚ |
|  | TX2001 | no anomalies | 99.9 | 92.4 | ⊚ |
|  | PC | breakage, cloudiness | 99.9 | — | X |
| Sodium hydroxide 10% | TX1001 | no anomalies | 100.1 | 36.2 | Δ |
|  | TX2001 | breakage | 100.1 | — | X |
|  | PC | breakage | 100.2 | — | X |
| Nitric acid 40% | TX1001 | no anomalies | 100 | 92 | ⊚ |
|  | TX2001 | no anomalies | 100 | 79.7 | ◯ |
|  | PC | discoloration | 100 | 72.3 | Δ |
| Acetone | TX1001 | whitening | 100.3 | 3.3 | X |
|  | TX2001 | whitening, breakage | 100.4 | — | X |
|  | PC | whitening, cloudiness, breakage | 101 | — | X |
| Ethanol | TX1001 | internal cracking | 100.1 | 104.2 | ⊚ |
|  | TX2001 | internal cracking | 100 | 92.2 | ⊚ |
|  | PC | internal cracking | 100 | 67 | Δ |
| Toluene | TX1001 | whitening, cloudiness, cracking | 100.6 | 3.2 | X |
|  | TX2001 | whitening, cloudiness, cracking | 100.8 | 1.7 | X |
|  | PC | whitening, cloudiness, cracking | 100.7 | 3 | X |
| Water-soluble cutting oil A | TX1001 | no anomalies | 100.1 | 103.5 | ⊚ |
|  | TX2001 | no anomalies | 100.1 | 98.5 | ⊚ |
|  | PC | no anomalies | 100 | 26.7 | X |
| Water-soluble cutting oil B | TX1001 | no anomalies | 100.1 | 88.2 | ⊚ |
|  | TX2001 | no anomalies | 100.1 | 101.6 | ⊚ |
|  | PC | no anomalies | 100.1 | 44.7 | Δ |
| Cylinder detergent | TX1001 | no anomalies | 100.1 | 103.9 | ⊚ |
|  | TX2001 | no anomalies | 100.1 | 98.9 | ⊚ |
|  | PC | no anomalies | 100.1 | 42 | Δ |
| Deodorizer for clothes | TX1001 | no anomalies | 100.1 | 98.9 | ⊚ |
|  | TX2001 | no anomalies | 100.1 | 93.9 | ⊚ |
|  | PC | no anomalies | 100.1 | 38.7 | Δ |

Based on the above, it was confirmed that polycyclohexylene dimethylene terephthalate copolyester resin exhibits favorable physical properties data and has chemical resistance even in environmental stress crack tests.

Using the test methods described above (disclosed above in (2) to (8)), weather resistance tests are performed, and the changes in the values of the physical properties of the test pieces before and after the weather resistance tests are checked. In the test of a vehicle that is habitually left in an outdoor environment, 2000 hours of an accelerated weather resistance test is deemed to be equivalent to 10 years, and if the properties after 2000 hours are 85% of the initial properties, then they are deemed to be non-problematic. In the case of a helmet, which is not habitually left in an outdoor environment, maintenance of the transmittance and the Charpy impact strength after 300 hours is deemed to indicate weather resistance.

Example 7

A. Test Pieces with Halved Weather Resistance Agents

The formulation for which an improvement in wear resistance was observed contains 0.5% of the ultraviolet The results for all 3 colors revealed that the tensile breaking strain decreased for the test pieces in which the amounts added were halved. Further, the result for the Charpy impact test for the white test piece was NB. In the test pieces in which the amounts added were halved, breakage occurred after 200 hours of the weather resistance test. It can be said that although the test pieces with halved amounts of the weather resistance agents exhibited a certain degree of weather resistance, the weather resistance was inferior to that of the test pieces containing the standard amounts.

Example 8

Change of Reagent

The colorant for the white color used in the test pieces up until this point was titanium oxide (White T2). For the purpose of comparison, the difference in weather resistance for a test piece colored with zinc sulfide (White T3) was investigated. There was no difference in the test results for the two test pieces prior to performing the weather resistance test. After performing the weather resistance test, the titanium oxide coloring yielded a better result for the color difference. In terms of the tensile breaking strain and the Charpy impact strength, the zinc sulfide coloring yielded better results.

Example 8

C. Halved Colorant

The difference in weather resistance for a test piece in which the amount of blueing colorant added was halved (Blueing T2) relative to the test piece containing the standard amount of the colorant (Blueing T1) was investigated. Results that indicated weather resistance were obtained for both test pieces.

achieve sterilization prior to use. The shape of the test pieces was a sheet of 4 cm×4 cm and a thickness of 1.5 mm for the polycarbonate and the weather-resistant Tritan™ (T1). The Virgin Tritan™ was 2 cm×4 cm with a thickness of 4 mm.

The polycarbonate, the weather-resistant Tritan™, and the Tritan™ Virgin as a reference value despite having a different thickness, were subjected to measurements of the color difference value before and after the gamma ray sterilization using a Chroma colorimeter CR-300 from Konica Minolta, Inc., a light source D65 and a viewing angle of 2°, and the color difference between the gamma ray irradiated lens and a new lens was determined. Because the lenses were transparent, measurement was performed with a white sheet laid beneath the lens.

TABLE 7

|  |  | TX1001 white | | | TX1001 C-Blue | | TX1001 C-Green | | TX2001 Blueing | |
| --- | --- | --- | --- | --- | --- | --- | --- | --- | --- | --- |
|  |  | T1 | T2 | T3 | T1 | T2 | T1 | T2 | T1 | T2 |
| Weather resistance test, presence of rain |  |  |  |  | no rain | | | | | |
| Resin grade | TX1001 |  | 100 |  | 100 | | 100 | | | |
|  | TX2001 |  |  |  |  | | | | 100 | |
| Color |  | white titanium oxide | white titanium oxide | white zinc sulfide | transparent blue | | transparent green | | blueing | half blueing |
| Ultraviolet absorber UV-3638™ |  | 0.5 | 2.5 | 2.5 | 0.5 | 2.5 | 0.5 | 2.5 | 0.5 | 0.5 |
| Hydrolysis inhibitor |  |  |  |  |  |  |  |  |  |  |
| Carbodilite™ LA-1 |  | 0.25 | 0.125 | 0.125 | 0.25 | 0.125 | 0.25 | 0.125 | 0.25 | 0.25 |
| Color difference | 100 h | 0.6 | 2.4 | 3.2 | 1.8 | 1.3 | 0.7 | 0.7 | 0.7 | 0.8 |
|  | 200 h | 2.4 | 5 | 7.6 | 3.1 | 3.4 | 0.5 | 0.8 | 0.6 | 1.2 |
|  | 300 h | 4.3 | 6.6 | 10.5 | 5.3 | 6.2 | 1.7 | 1.7 | 1.9 | 2.6 |
|  | evaluation | ○ | ○ | X | ○ | ○ | ○ | ○ | ○ | ○ |
| Transmittance % | 0 h |  |  |  | 37.9 | 37.5 | 72.9 | 72.7 | 86.2 | 87.2 |
|  | 100 h |  |  |  | 38.5 | 37 | 71.9 | 71.9 | 85.5 | 88.2 |
|  | 200 h |  |  |  | 38.4 | 37.1 | 72.6 | 72.7 | 85.3 | 86.8 |
|  | 300 h |  |  |  | 39.3 | 37.9 | 71.8 | 73 | 84.2 | 84.7 |
|  | evaluation |  |  |  | ○ | ○ | ○ | ○ | ○ | ○ |
| Tensile breaking strain % | 0 h | 73.3 | 91.3 | 93.3 | 64.2 | 39.8 | 60.9 | 74.5 | 52.8 | 63.7 |
|  | 100 h | 64 | 45.9 | 58.9 | 43 | 38 | 32.8 | 39.7 | 27.1 | 51.4 |
|  | 200 h | 51.4 | 26.6 | 47.4 | 37.1 | 40.5 | 40 | 25.3 | 23.2 | 26.7 |
|  | 300 h | 33.2 | 15 | 46.3 | 29.5 | 22.6 | 33.9 | 22.5 | 22.1 | 18.9 |
|  | evaluation | ○ | Δ | ○ | ○ | Δ | ○ | Δ | Δ | Δ |
| Charpy impact strength kJ/m² | 0 h | NB | NB | NB | NB | NB | NB | NB | 64.2 | NB |
|  | 100 h | NB | NB | NB | NB | NB | NB | NB | 66.1 | 65.8 |
|  | 200 h | NB | 73.1 | NB | NB | NB | NB | NB | 64.8 | 65.5 |
|  | 300 h | NB | 73.2 | NB | NB | NB | NB | NB | 71.1 | 64.6 |
|  | evaluation | ○ | X | ○ | ○ | ○ | ○ | ○ | ○ | ○ |
| Overall evaluation |  | ○ | Δ | Δ | ○ | Δ | ○ | Δ | ○ | ○ |

When O is recorded in the overall evaluation above, this indicates good results. Further, Δ also indicates no problems during use.

Gamma Ray Sterilization Test

Test pieces (sheets of 4 cm×4 cm having a thickness of 1.5 mm) of polycarbonate and a weather-resistant Tritan™ (TX2001 Blueing T1), and a test piece (a sheet of 2 cm×4 cm having a thickness of 4 mm) of Tritan™ Virgin (TX2001) are irradiated with gamma rays using a gamma ray irradiation device (RIC-1 (model 1), manufactured by Radia Industry Co., Ltd.). Following irradiation with a prescribed absorbed dose, (10 kGy, 20 kGy), the test pieces are removed, and the changes in the physical properties of the test pieces before and after the gamma ray sterilization test are checked using the evaluation tests described above (disclosed in the above sections (3) to (5)).

Each item was investigated in relation to the possibility of irradiating spectacles made of Tritan™ with gamma rays to The existing polycarbonate lens and the tested additive-containing Tritan™ lens (T1) were compared. Although the thickness was different, a dumbbell-shaped test piece molded using Tritan™ Virgin pellets was measured as a reference value.

The polycarbonate underwent marked discoloration even at 10 kGy. The Tritan™ Virgin underwent almost no discoloration even at 20 kGy. The weather-resistant Tritan™ discolored slightly at 10 kGy, and underwent perceptible discoloration at 20 kGy.

TABLE 8

|  | Absorbed dose | 0 kGy | 10 kGy | 20 kGy |
| --- | --- | --- | --- | --- |
| Polycarbonate (thickness 1.5 mm) | L* | −2.96 | −3.62 | −4.83 |
|  | a* | 0.09 | −0.89 | −2.6 |
|  | b* | 0.05 | 3.95 | 11.06 |
|  | ΔE*ab |  | 4.08 | 11.49 |

TABLE 8-continued

| | Absorbed dose | 0 kGy | 10 kGy | 20 kGy |
|---|---|---|---|---|
| Weather-resistant Tritan ™ (thickness 1.5 mm) | L* | −4.2 | −4.43 | −4.49 |
| | a* | 0.18 | −0.16 | −0.62 |
| | b* | −0.34 | 0.8 | 2.27 |
| | ΔE*ab | | 1.21 | 2.74 |
| Tritan ™ Virgin (thickness 4 mm) | L* | −7.84 | −7.93 | −7.69 |
| | a* | 0.18 | 0.21 | 0.12 |
| | b* | 0.43 | 0.2 | 0.45 |
| | ΔE*ab | | 0.25 | 0.16 |

TABLE 9

The meanings of the ΔE*ab values in the above Table 8 are as shown in the following table.

| Value of ΔE*ab | Evaluation |
|---|---|
| 0.0 to 0.5 | very slightly different |
| 0.5 to 1.5 | slightly different |
| 1.5 to 3.0 | perceptibly different |
| 3.0 to 6.0 | markedly different |
| 6.0 to 12.0 | very markedly different |
| 12.0 or greater | different color system |

The polycarbonate underwent a reduction in visible transmittance of 1.6% upon 20 kGy gamma ray sterilization. The weather-resistant Tritan™ and the Tritan™ Virgin underwent no reduction in visible transmittance even after the gamma ray sterilization.

Whereas polycarbonate is affected by gamma rays, Tritan™ and the weather resistance agents used are not affected.

The above results confirm that, as shown in the following table, Tritan™ has favorable physical properties and exhibits resistance to gamma rays.

TABLE 8

| | Visible transmittance | | |
|---|---|---|---|
| Absorbed dose | 0 kGy | 10 kGy | 20 kGy |
| Polycarbonate (thickness 1.5 mm) | 92.2% | 91.5% | 90.6% |
| Weather-resistant Tritan ™ (thickness 1.5 mm) | 90.4% | 90.4% | 90.4% |
| Tritan ™ Virgin (thickness 4 mm) | 88.9% | 89.0% | 89.1% |

(11) Ultraviolet Transmittance Test

Testing was performed based on "Testing methods for optical properties of plastics (JIS K 7105)". Test pieces (dumbbell-shaped and 3-step plate-shaped) (spectacle lenses) are each installed in a test piece installation location in front of the light receiving section of a recording spectrophotometer (U-4100 manufactured by Hitachi High-Technologies Corporation), and the spectral transmittance is measured in the wavelength region from 380 nm to 780 nm at a scan speed of 600 nm/min and a sampling interval of 1.00 nm. The measured spectral transmittance is converted to (visual) transmittance (using the conversion formula of JIS T8147), and this value is checked.

[Numerical Formula 1] Calculation Formula for Visual Transmittance $$Tv = \frac{\int_{380nm}^{780nm} P_{e\lambda} T(\lambda) V(\lambda) d\lambda}{\int_{380nm}^{780nm} P_{e\lambda} V(\lambda) d\lambda} \times 100$$

$P_{e\lambda}$: value of spectral distribution of standard illuminant A
$V(\lambda)$: photopic spectral luminous efficiency at 2 degrees viewing angle
$T(\lambda)$: spectral transmittance of test filter
Tv: visual transmittance (%)

In JIS T 8147:2003 "Eye protectors", the visual transmittance for the lenses of eye protectors is set at 85% or greater, and therefore the pass line for transmittance is deemed to be 85% or higher.

For the test piece, UV3638™: 0.5% and LA-1: 0.25% are added to TX2001, and fine color adjustment (blueing) is performed. For T2, the fine color adjustment (blueing) is reduced by half relative to T1.

Visual transmittance is light visible to the eye (visible light) in the wavelength range from 380 nm to 780 nm, but the sensitivity of the human eye differs depending on the wavelength (for light of the same intensity, green and yellow light is perceived as bright, and purple and red light is perceived as dull). A weighted averaging is performed that emphasizes the transmittance for wavelengths having a high relative spectral luminous efficiency, and minimizes the transmittance for wavelengths having a low spectral luminous efficiency. A visual transmittance of 100% indicates colorless transparency.

Ultraviolet radiation is light having a shorter wavelength than visible light (380 nm or less). It is harmful to the eyes, and can cause keratitis and cataracts. Although not specified in JIS standards for eye protectors, it is desirable that ultraviolet radiation is not transmitted.

Polycarbonate has high visual transmittance, but exhibits almost no transmittance of the ultraviolet region, and is therefore widely used as the lens material for eye protectors.

Tritan™ Virgin has high visual transmittance, and transmits light in the ultraviolet region, but the weather-resistant Tritan™ has high visual transmittance, but exhibits almost no transmittance of the ultraviolet region. It can be stated that adding the weather resistance agents to Tritan™ enhances the utility value as a lens material for eye protectors.

TABLE 10

| | Ultraviolet region transmittance 280 to 380 nm |
|---|---|
| Polycarbonate (thickness 1.5 mm) | 0.2% |
| Weather-resistant Tritan (thickness 1.5 mm) | 0.7% |
| Tritan Virgin (thickness 4 mm) | 26.6% |

INDUSTRIAL APPLICABILITY

A transparent resin composition can be provided that always exhibits superior stability, and is stable and has weather resistance and chemical resistance under natural environmental conditions and under similar or harsher usage conditions, and therefore use across a wide range can be promoted.

SIMPLE DESCRIPTION OF REFERENCE SYMBOLS

11: Test piece (dumbbell shape)
12: Test piece (3-step plate shape)
21: Test piece attachment plate
22: Control panel
23: Xenon lamp
24: Water spray port
31: Measurement apparatus
32: Test piece
41: Gloss meter
42: Test piece
51: Monochromatic light irradiation port
52: Test piece
53: Light receiving section
61: Load cell
62: Test piece
63: Chuck
71: Load cell
72: Test piece
73: Indenter
74: Support platform
81: Striking bit
82: Test base
83: Support base
91: Fastener
92: Test piece
93: Fixed strain jig
94: Chemical receptacle
95: Chemical substance

The invention claimed is:

1. A transparent resin composition which is stable and has weather resistance and chemical resistance, comprising:
  a copolymer resin that comprises a dimethyl terephthalate as an acid component, and comprises a 1,4-cyclohexanedimethanol and a 2,2,4,4,-tetramethylcyclobutan-1,3-diol as a glycol component;
  0.25 to 2.5% by weight of an ultraviolet absorber composed of a benzoxazinone-based compound; and
  0.125 to 0.5% by weight of polycarbodiimide.

2. The transparent resin composition according to claim 1, the composition further comprising an antioxidant and/or a heat-resistant material.

3. A helmet produced using the transparent resin composition according to claim 1.

4. A face shield for a helmet, produced using the transparent resin composition according to claim 1.

5. A spectacle lens produced using the transparent resin composition according to claim 1.

6. An outer case for storing items, produced using the transparent resin composition according to claim 1.

7. A sheet material for outdoor installation, produced using the transparent resin composition according to claim 1.

8. A frame for spectacles or a temple for spectacles, produced using the transparent resin composition according to claim 1.

9. The transparent resin composition according to claim 2, wherein the antioxidant includes a hindered phenol-based antioxidant, and the heat-resistant material includes a phosphorus-based process heat stabilizer.

10. The transparent resin composition according to claim 1, wherein the acid component of the copolymer resin comprises 40 to 90 mol % of the dimethyl terephthalate.

* * * * *